United States Patent
Kuzo et al.

(10) Patent No.: US 8,982,097 B1
(45) Date of Patent: Mar. 17, 2015

(54) WATER REJECTION AND WET FINGER TRACKING ALGORITHMS FOR TRUETOUCH PANELS AND SELF CAPACITANCE TOUCH SENSORS

(71) Applicant: Cypress Semiconductor Corporation, San Jose, CA (US)

(72) Inventors: Taras Kuzo, Lviv (UA); Victor Kremin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/226,660

(22) Filed: Mar. 26, 2014

Related U.S. Application Data

(60) Provisional application No. 61/910,751, filed on Dec. 2, 2013.

(51) Int. Cl.
*G06F 3/045* (2006.01)
*G06F 3/044* (2006.01)

(52) U.S. Cl.
CPC ..................................... *G06F 3/044* (2013.01)
USPC ........................................................ 345/174

(58) Field of Classification Search
USPC ...................... 345/156–184; 178/18.01–18.11
See application file for complete search history.

(56) References Cited

U.S. PATENT DOCUMENTS

| | | | |
|---|---|---|---|
| 5,119,079 A | 6/1992 | Hube et al. | |
| 7,116,315 B2 | 10/2006 | Sharp et al. | |
| 7,606,398 B2 | 10/2009 | Nysaether et al. | |
| 7,812,830 B2 | 10/2010 | Wang | |
| 8,624,866 B2 * | 1/2014 | Chang | 345/174 |
| 8,692,563 B1 * | 4/2014 | Maharyta | 324/658 |
| 8,773,146 B1 * | 7/2014 | Hills et al. | 324/658 |
| 2007/0230754 A1 | 10/2007 | Jain et al. | |
| 2008/0136792 A1 * | 6/2008 | Peng et al. | 345/174 |
| 2009/0229892 A1 | 9/2009 | Fisher et al. | |
| 2010/0245286 A1 | 9/2010 | Parker | |
| 2011/0084936 A1 * | 4/2011 | Chang et al. | 345/174 |
| 2011/0157068 A1 | 6/2011 | Parker et al. | |
| 2011/0175835 A1 * | 7/2011 | Wang | 345/173 |
| 2012/0050214 A1 * | 3/2012 | Kremin et al. | 345/174 |
| 2012/0062510 A1 * | 3/2012 | Mo et al. | 345/174 |
| 2012/0092288 A1 | 4/2012 | Wadia | |
| 2012/0176179 A1 * | 7/2012 | Harders et al. | 327/517 |
| 2012/0268411 A1 | 10/2012 | Chen et al. | |
| 2013/0176268 A1 | 7/2013 | Li et al. | |
| 2013/0207935 A1 * | 8/2013 | Toda et al. | 345/174 |

(Continued)

OTHER PUBLICATIONS

Anderson, Erik, "The basics of waterproofing capacitive touchscreens," EE Times, http://www.eetimes.com/document.asp?doc_id=1279691, Jun. 6, 2012.

(Continued)

*Primary Examiner* — Rodney Amadiz
(74) *Attorney, Agent, or Firm* — Lowenstein Sandler Inc

(57) ABSTRACT

A method, apparatus, and system to detect a self-capacitance activation in view of a self-capacitance measurement of a first electrode. The method, apparatus, and system further to detect a mutual capacitance activation in view of a mutual capacitance measurement of a pair of electrodes, and to determine the presence of water proximate to the capacitive button when the self-capacitance activation is false and the mutual capacitance activation is true. The capacitive button is disposed on a substrate.

20 Claims, 14 Drawing Sheets

(56) References Cited

U.S. PATENT DOCUMENTS

2013/0278543 A1* 10/2013 Hsu et al. ............... 345/174
2014/0104222 A1* 4/2014 Chang ..................... 345/174
2014/0204058 A1* 7/2014 Huang et al. ............ 345/174

OTHER PUBLICATIONS

Carey, John, "Capacitive Sensing Shaping UI for Mobile," Wireless Communications Alliance Mobile and Future SIGs Event, Apr. 2012; 7 pages.

Castorina, A, "PCA based Shape Recognition for Capacitive Touch Display," IEEE International Conference on Consumer Electronics, 2013, pp. 596-597; 2 pages.

"mXT224 Introducing State of the Art maXTouch touchscreen technology", Atmel Corporation.

"SSD2521 Capacitive Touch Screen Controller", Anglia Components Ltd.

"S-Touch FingerTip Multi-Touch Capacitive Touchscreen Controller", ST Microelectronics.

Cypress Semiconductor Corporation, TrueTouch® Touchscreen Controllers webpage [online], <URL:http://www.cypress.com/touch/>.

* cited by examiner

| | C0 | C1 | C2 | C3 | C4 | C5 | C6 | C7 | C8 | C9 |
|---|---|---|---|---|---|---|---|---|---|---|
| R0 | 0 | 0 | 0 | 0 | 0 | 0 | 0 | 0 | 0 | 0 |
| R1 | 0 | 0 | 0 | 0 | 0 | 0 | 0 | 0 | 0 | 0 |
| R2 | 0 | 0 | 0 | 0 | 0 | 0 | 0 | 0 | 0 | 0 |
| R3 | 0 | 0 | 0 | 0 | 0 | 0 | 0 | 0 | 0 | 0 |
| R4 | 0 | 0 | 0 | 0 | 0 | 0 | 0 | 0 | 0 | 0 |
| R5 | 0 | 0 | 0 | 0 | 0 | 0 | 0 | 0 | 0 | 0 |
| R6 | 0 | 0 | 0 | 0 | 12 | 37 | 3 | 0 | 0 | 0 |
| R7 | 0 | 0 | 0 | 0 | 47 | 77 | 35 | 0 | 0 | 0 |
| R8 | 0 | 0 | 0 | 0 | 10 | 34 | 1 | 0 | 0 | 0 |
| R9 | 0 | 0 | 0 | 0 | 0 | 0 | 0 | 0 | 0 | 0 |
| R10 | 0 | 0 | 0 | 0 | 0 | 0 | 0 | 0 | 0 | 0 |
| R11 | 0 | 0 | 0 | 0 | 0 | 0 | 0 | 0 | 0 | 0 |
| R12 | 0 | 0 | 0 | 0 | 0 | 0 | 0 | 0 | 0 | 0 |
| R13 | 0 | 0 | 0 | 0 | 0 | 0 | 0 | 0 | 0 | 0 |

FIG. 14B (1400)

| | C0 | C1 | C2 | C3 | C4 | C5 | C6 | C7 | C8 | C9 |
|---|---|---|---|---|---|---|---|---|---|---|
| R0 | 0 | 0 | 0 | 0 | 0 | 0 | 0 | 0 | 0 | 0 |
| R1 | 0 | 0 | 0 | 0 | 0 | 0 | 0 | 0 | 0 | 0 |
| R2 | 0 | 0 | 0 | 0 | 0 | 0 | 0 | 0 | 0 | 1 |
| R3 | 0 | 0 | 0 | 0 | 0 | 0 | 0 | 0 | 0 | 5 |
| R4 | 0 | 0 | 0 | 0 | 0 | 1 | 0 | 0 | 0 | 7 |
| R5 | 0 | 0 | 0 | 0 | 0 | 1 | 3 | 3 | 7 | 19 |
| R6 | 0 | 0 | 0 | 0 | 0 | 1 | 8 | 7 | 8 | 72 |
| R7 | 0 | 0 | 0 | 0 | 0 | 1 | 7 | 6 | 22 | 31 |
| R8 | 0 | 0 | 0 | 0 | 1 | 2 | 3 | 6 | 31 | 30 |
| R9 | 0 | 0 | 0 | 0 | 0 | 1 | 7 | 5 | 18 | 6 |
| R10 | 3 | 0 | 0 | 0 | 0 | 0 | 2 | 3 | 5 | 6 |
| R11 | 1 | 3 | 0 | 0 | 0 | 2 | 0 | 0 | 6 | 3 |
| R12 | 3 | 2 | 0 | 0 | 0 | 0 | 0 | 0 | 5 | 0 |
| R13 | 0 | 0 | 0 | 0 | 0 | 0 | 0 | 0 | 0 | 0 |

FIG. 14C (1420)

| | C0 | C1 | C2 | C3 | C4 | C5 | C6 | C7 | C8 | C9 |
|---|---|---|---|---|---|---|---|---|---|---|
| R0 | 0 | 0 | 0 | 0 | 0 | 0 | 0 | 0 | 0 | 0 |
| R1 | 0 | 0 | 0 | 0 | 0 | 0 | 0 | 0 | 0 | 0 |
| R2 | 0 | 0 | 0 | 0 | 0 | 0 | 0 | 0 | 0 | 0 |
| R3 | 0 | 0 | 0 | 0 | 0 | 0 | 0 | 0 | 0 | 7 |
| R4 | 0 | 0 | 0 | 0 | 0 | 2 | 0 | 2 | 4 | 30 |
| R5 | 0 | 0 | 0 | 0 | 0 | 4 | 13 | 19 | 42 | 46 |
| R6 | 0 | 0 | 0 | 0 | 0 | 2 | 35 | 42 | 73 | 48 |
| R7 | 0 | 0 | 0 | 0 | 0 | 0 | 27 | 22 | 48 | 36 |
| R8 | 0 | 0 | 0 | 2 | 5 | 8 | 1 | 14 | 30 | 35 |
| R9 | 0 | 0 | 0 | 0 | 0 | 0 | 13 | 17 | 21 | 24 |
| R10 | 13 | 13 | 0 | 0 | 1 | 0 | 6 | 13 | 19 | 20 |
| R11 | 4 | 3 | 0 | 0 | 0 | 6 | 0 | 13 | 22 | 21 |
| R12 | 15 | 9 | 0 | 0 | 0 | 0 | 0 | 0 | 18 | 9 |
| R13 | 0 | 0 | 0 | 0 | 0 | 0 | 0 | 0 | 0 | 0 |

WATER REJECTION AND WET FINGER TRACKING ALGORITHMS FOR TRUETOUCH PANELS AND SELF CAPACITANCE TOUCH SENSORS

RELATED APPLICATIONS

This application claims the benefit of U.S. Provisional Application No. 61/910,751, filed Dec. 2, 2013, which is hereby incorporated herein by reference in its entirety.

TECHNICAL FIELD

The present disclosure relates generally to sensing systems, and more particularly to capacitance-sensing systems configurable to determine touch locations of touches and predict false touches on the capacitance-sensing systems in wet conditions.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level or is parasitically coupled to Earth Ground. A touch panel has a distributed load of capacitance of both types (1) and (2) and some touch solutions sense both capacitances either uniquely or in hybrid form with its various sense modes.

BRIEF DESCRIPTION OF THE DRAWINGS

The present invention is illustrated by way of example, and not of limitation, in the figures of the accompanying drawings.

FIG. 9 is an example of cells of a sense array, according to one embodiment.

FIG. 13A illustrates cells of a sense array, according to one embodiment.

FIG. 13B illustrates cells of a sense array, according to another embodiment.

FIG. 13C illustrates cells of a sense array, according to another embodiment.

FIG. 14A illustrates cells of a sense array, according to one embodiment.

FIG. 14B illustrates cells of a sense array, according to one embodiment.

FIG. 14C illustrates cells of a sense array, according to one embodiment.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In capacitive touch sensing systems, water may be present on the touch display, resulting in corrupt measurement, false touches, and lost touches. For example, the measured capacitance values of water on capacitive buttons are similar to the measured capacitance value of a touch on capacitive buttons. As a result, water on a capacitive button may be mistaken as an actual touch, and a resultant false touch reported. The embodiments described herein are directed at detecting the presence of water on a sense array, specifically on a capacitive button, and detecting a touch on the capacitive button even in the presence of water. The embodiments herein may accurately measure a touch under a variety of water conditions, such as described below with respect to FIGS. 4-10. Alternatively, other advantages may be achieved.

Figure 1:
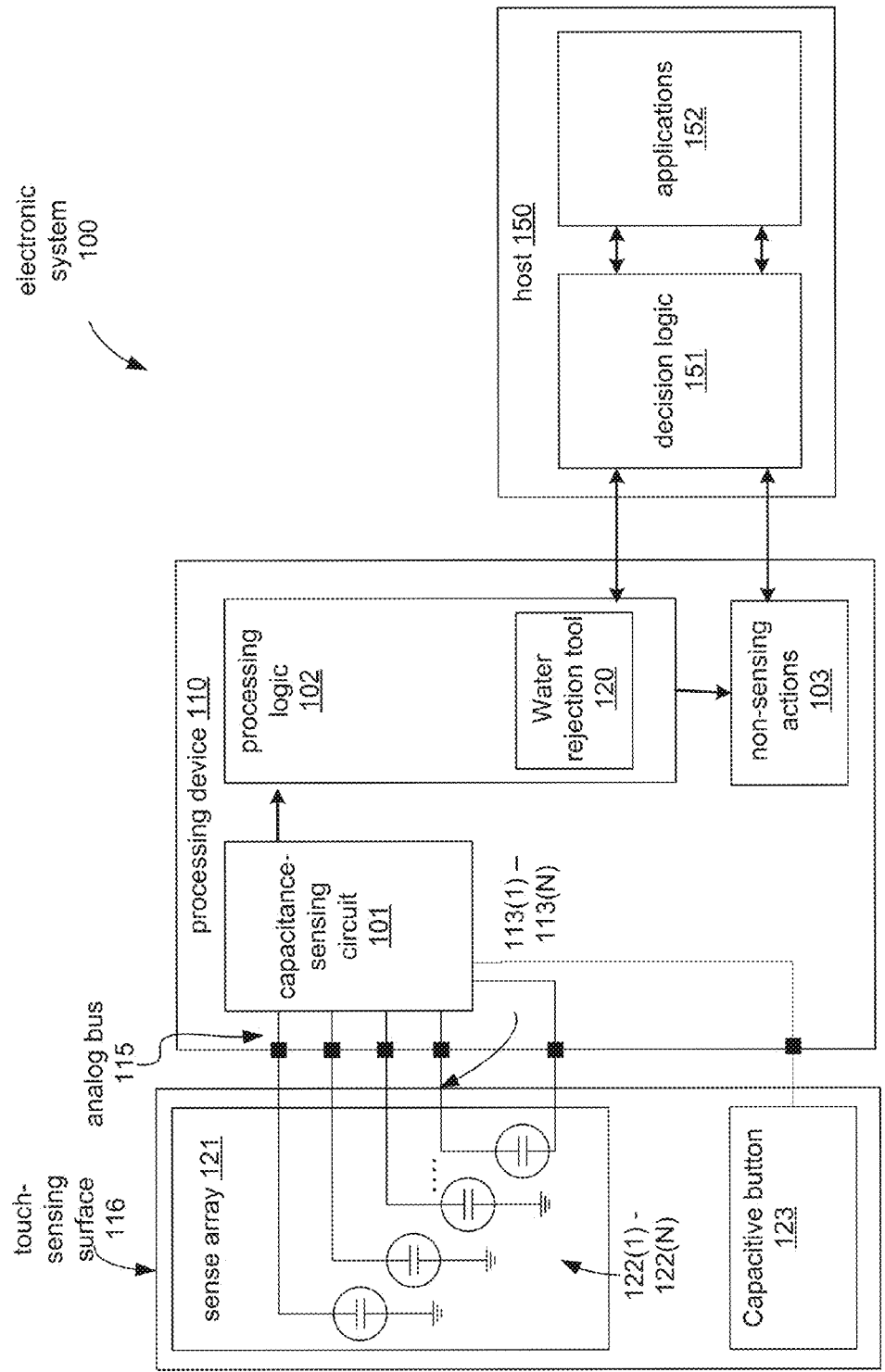
FIG. 1 is a block diagram illustrating an electronic system that processes touch data, according to one embodiment.

FIG. 1 is a block diagram illustrating an electronic system that processes touch data, according to one embodiment. FIG. 1 illustrates an electronic system 100 including a processing device 110 that may be configured to measure capacitances from a touch-sensing surface 116 including a sense array 121 (e.g., capacitive-sense array) with water rejection tool 120. In one embodiment, a multiplexer circuit may be used to connect a capacitance-sensing circuit 101 with a sense array 121. The electronic system 100 includes a touch-sensing surface 116 (e.g., a touchscreen, or a touch pad) coupled to the processing device 110, which is coupled to a host 150. In one embodiment the touch-sensing surface 116 is a two-dimensional sense array (e.g., sense array 121) that uses processing device 110 to detect touches on the surface 116.

In one embodiment, water rejection tool 120 may detect the presence of water proximate to one or more electrodes of a sense array. Water rejection tool 120 can obtain capacitance data using self-capacitance scanning of an electrode of the sense array. An electrode may be used by processing device 110 to behave like a button. It should be noted that a capacitive sensor may refer to, for example, an electrode of the sense array, a pair of electrodes of the sense array, a button, or any capacitive sensing element. When capacitance measured on an electrode above a touch threshold, the measurement may be registered as a touch on the capacitive button. Water rejection tool 120 may also obtain capacitance data using mutual-capacitance scanning of a pair of electrodes, such as the electrode scanned for the self-capacitance scanning and another electrode of the electrode pair. As a result, the capacitance data obtained includes a self-capacitance measurement of the electrode scanned during self-capacitance scanning (hereinafter referred to as self-capacitance electrode for description purposes) and a mutual capacitance measurement of the mutual capacitance between two electrode scanned during mutual capacitance scanning (hereinafter referred to as mutual capacitance electrode pair for description purposes). Water rejection tool 120 may compare the self-capacitance measurement to a self-capacitance threshold, and compare the mutual capacitance measurement to a mutual capacitance threshold. Water on a has experimentally been shown to strongly affect adjacent mutual capacitance measurements, but weakly affect self-capacitance measurements of electrodes near the water. Water rejection tool 120 uses this phenomenon to determine if water is on the capacitive button. When the self-capacitance activation is false (i.e., self-capacitance measurement not greater than the self-capacitance threshold) and the mutual capacitance activation is true (i.e., mutual capacitance measurement is greater than the mutual capacitance threshold), water rejection tool 120 determines water is on the capacitive button. Once water has been sensed on the capacitive button, water rejection tool 120 may adapt the touch detection threshold based on water (e.g., water touch detection threshold) so that the water rejection tool 120 may sense a touch on the button, even though the button is wet. The touch detection threshold is a capacitance value (e.g., 160 counts) above which measured capacitance data from the sense array (e.g., sense array 121) indicates a touch, and below which no touch is registered. For example, if a measured capacitance value exceeds the touch detection threshold, the water rejection tool 120 indicates a touch. If a measured capacitance value is lower than the touch detection threshold, the water rejection tool 120 indicates no touch is sensed. It should be noted that water on a capacitive sense array typically increases the capacitive measurements for the electrodes immediately submersed under the water. As such, water may appear to a sensing device as a touch (e.g., false touch) and a sensing device may not be able to differentiate between water and an actual touch.

In one embodiment, the sense array 121 includes electrodes 122(1)-122(N) (where N is a positive integer) that are disposed as a two-dimensional matrix (also referred to as an XY matrix). The sense array 121 is coupled to pins 113(1)-113(N) of the processing device 110 via one or more analog buses 115 transporting multiple signals. In sense array 121, the first three electrodes (i.e., electrodes 122(1)-(3)) are connected to capacitance-sensing circuit 101 and to ground, illustrating a self-capacitance configuration. The last electrode (i.e., 122(N)) has both terminals connected to capacitance-sensing circuit 101, illustrating a mutual capacitance configuration. In an alternative embodiment without an analog bus, each pin may instead be connected either to a circuit that generates a transmit (TX) signal or to an individual receive (RX) sensor circuit. The sense array 121 may include a multi-dimension capacitive sense array. The multi-dimension sense array includes multiple sense elements, organized as rows and columns. In another embodiment, the sense array 121 operates as an all-points-addressable ("APA") mutual capacitive sense array. The sense array 121 may be disposed to have a flat surface profile. Alternatively, the sense array 121 may have non-flat surface profiles. Alternatively, other configurations of capacitive sense arrays may be used. For example, instead of vertical columns and horizontal rows, the sense array 121 may have a hexagon arrangement, or the like. In one embodiment, the sense array 121 may be included in an indium tin oxide (ITO) panel or a touch screen panel. In one embodiment, sense array 121 is a capacitive sense array. In another embodiment, the sense array 121 is non-transparent capacitive sense array (e.g., PC touchpad). In one embodiment, the sense array is configured so that processing device 110 may generate touch data for a touch detected proximate to the capacitive sense array, the touch data represented as a plurality of cells.

In one embodiment, the capacitance-sensing circuit 101 may include a relaxation oscillator or other means to convert a capacitance into a measured value. The capacitance-sensing circuit 101 may also include a counter or timer to measure the oscillator output. The processing device 110 may further include software components to convert the count value (e.g., capacitance value) into a touch detection decision or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance-sensing circuit 101 may be evaluating other measurements to determine the user interaction. For example, in the capacitance-sensing circuit 101 having a sigma-delta modulator, the capacitance-sensing circuit 101 is evaluating the ratio of pulse widths of the output (i.e., density domain), instead of the raw counts being over or under a certain threshold.

In another embodiment, the capacitance-sensing circuit 101 includes a TX signal generator to generate a TX signal (e.g., stimulus signal) to be applied to the TX electrode and a receiver (also referred to as a sensing channel), such as an integrator, coupled to measure an RX signal on the RX electrode. In a further embodiment, the capacitance-sensing circuit 101 includes an analog-to-digital converter (ADC) coupled to an output of the receiver to convert the measured RX signal to a digital value. The digital value can be further processed by the processing device 110, the host 150 or both.

The processing device 110 is configured to detect one or more touches on a touch-sensing device, such as the sense array 121. The processing device can detect conductive objects, such as touch objects 140 (fingers or passive styluses, an active stylus, or any combination thereof). The capacitance-sensing circuit 101 can measure a touch data on the sense array 121. The touch data may be represented as multiple cells, each cell representing an intersection of sense elements (e.g., electrodes) of the sense array 121. The capacitive sense elements are electrodes of conductive material, such as copper, silver, indium tin oxide (ITO), metal mesh, carbon nanotubes, or the like. The sense elements may also be part of an ITO panel. The capacitive sense elements can be used to allow the capacitance-sensing circuit 101 to measure self-capacitance, mutual capacitance, or any combination thereof. In another embodiment, the touch data measured by the capacitance-sensing circuit 101 can be processed by the processing device 110 to generate a 2D capacitive image of the sense array 121 (e.g., capacitive-sense array). In one embodiment, when the capacitance-sensing circuit 101 measures mutual capacitance of the touch-sensing device (e.g., capacitive-sense array), the capacitance-sensing circuit 101 determines a 2D capacitive image of the touch-sensing object on the touch surface and processes the data for peaks and positional information. In another embodiment, the processing device 110 is a microcontroller that obtains a capacitance touch signal data set, such as from a sense array, and finger detection firmware executing on the microcontroller identifies data set areas that indicate touches, detects and processes peaks, calculates the coordinates, or any combination therefore. The firmware can calculate a precise coordinate for the resulting peaks. In one embodiment, the firmware can calculate the precise coordinates for the resulting peaks using a centroid algorithm, which calculates a centroid of the touch, the centroid being a center of mass of the touch. The centroid may be an X/Y coordinate of the touch. Alternatively, other coordinate interpolation algorithms may be used to determine the coordinates of the resulting peaks. The microcontroller can report the precise coordinates to a host processor, as well as other information.

In one embodiment, the processing device 110 further includes processing logic 102. Some or all of the operations of the processing logic 102 may be implemented in firmware, hardware, or software or some combination thereof. The processing logic 102 may receive signals from the capacitance-sensing circuit 101, and determine the state of the sense array 121, such as whether an object (e.g., a finger) is detected on or in proximity to the sense array 121 (e.g., determining the presence of the object), resolve where the object is on the sense array (e.g., determining the location of the object), tracking the motion of the object, or other information related to an object detected at the touch sensor. In another embodiment, processing logic 102 may include capacitance-sensing circuit 101.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Water rejection tool 120 may be implemented partially or fully by decision logic 151. Water rejection tool 120 may be a module within decision logic 151. Alternatively, water rejection tool 120 may be an algorithm in decision logic 151. Host 150 may obtain raw capacitance data from processing device 110, and determine if a touch has occurred or not occurred on sense array 121. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. Non-sensing actions block 103 may be used to process and/or receive/transmit data to and from the host 150. For example, additional components may be implemented to operate with the processing device 110 along with the sense array 121 (e.g., keyboard, keypad, mouse, trackball, LEDs, displays, or other peripheral devices).

As illustrated, capacitance-sensing circuit 101 may be integrated into processing device 110. Capacitance-sensing circuit 101 may include an analog I/O for coupling to an external component, such as touch-sensor pad (not shown), sense array 121, touch-sensor slider (not shown), touch-sensor buttons (not shown), and/or other devices. The capacitance-sensing circuit 101 may be configurable to measure capacitance using mutual-capacitance sensing techniques, self-capacitance sensing technique, charge coupling techniques, combinations thereof, or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the sense array 121 are configurable to operate as TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of an RX electrode and a TX electrode (including one or more sense element) as done during mutual-capacitance sensing. An intersection between two sense elements may be understood as a location at which one sense electrode crosses over or overlaps another, while maintaining galvanic isolation from each other. The capacitance associated with the intersection between a TX electrode and an RX electrode can be sensed by selecting every available combination of TX electrode and RX electrode. When a touch object (i.e., conductive object), such as a finger or stylus, approaches the sense array 121, the touch object causes a decrease in mutual capacitance between some of the TX/RX electrodes. In another embodiment, the presence of a finger increases the coupling capacitance of the electrodes. Thus, the location of the finger on the sense array 121 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art. In addition, various types of coordinate interpolation algorithms may be used to detect the center of the touch as would be appreciated by one of ordinary skill in the art.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC®) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel, among others. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Electronic system 100 includes capacitive button 123. Capacitive button 123 is connected to processing logic 110. In one embodiment, capacitive button 123 may be a single electrode. In another embodiment, capacitive button 123 may be a pair of electrodes. In one embodiment, capacitive button 123 is disposed on a substrate. In one embodiment, capacitive button 123 may be part of sense array 121. In another embodiment, capacitive button may be a separate from sense array 121. In one embodiment, capacitive button 123 may be used to in self-capacitance scan mode. In another embodiment, capacitive button 123 may be used in mutual capacitance scan mode. In one embodiment, capacitive button 123 may be used in both self-capacitance scan mode and mutual capacitance scan mode. Capacitive button 123 may be one or more distinct buttons.

Figure 2:
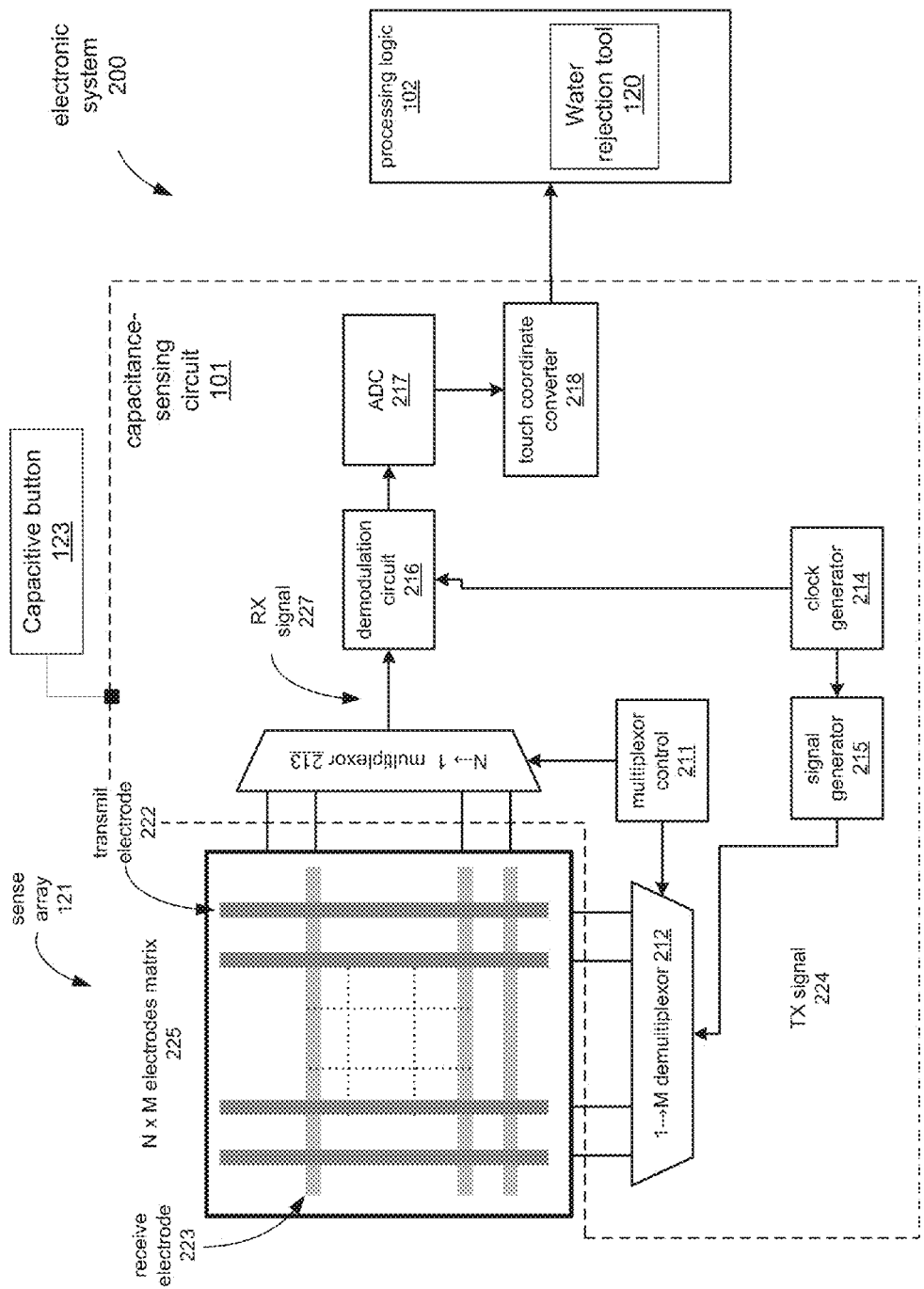
FIG. 2 is a block diagram illustrating an electronic system that processes touch data, according to another embodiment.

FIG. 2 is a block diagram illustrating an electronic system that processes touch data, according to another embodiment. Electronic system 200 includes sense array 121 composed of orthogonal electrodes and a capacitance-sensing circuit 101 that converts changes in measured capacitances to coordinates indicating the presence and location of touch. In one embodiment, the capacitance-sensing circuit 101 may measure mutual capacitances for intersections between transmit and receive electrodes in the sense array 121. The touch coordinates are calculated based on changes in the measured capacitances relative to the capacitances of sense array 121 in an un-touched state. Sense array 121 includes a matrix 225 of N×M electrodes (N receive electrodes and M transmit electrodes), which further includes transmit (TX) electrode 222 and receive (RX) electrode 223. Each of the electrodes in matrix 225 is connected with capacitance-sensing circuit 101 through demultiplexer 212 and multiplexer 213.

Capacitance-sensing circuit 101 includes multiplexer control 211, demultiplexer 212, multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

In another embodiment, ADC 217 may be followed by a raw data processing block (not shown). The raw data processing block may perform functions on the data from ADC 217, such as set and change baseline values, apply raw data filters, perform difference updates, etc. The touch coordinate converter 218 may follow the raw data processing block. In another embodiment, touch coordinate converter 218 may contain water rejection tool 120.

Transmit and receive electrodes in the electrode matrix 225 may be arranged so that each of the transmit electrodes overlap and cross each of the receive electrodes to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of sense array 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein the first and second voltages are different.

The output of signal generator 215 is connected with demultiplexer 212, which allows the TX signal 224 to be applied to any of the M transmit electrodes of sense array 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied. In an alternate embodiment the TX signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with the intersections of all TX electrodes and RX electrodes can be measured by selecting every available combination of TX electrode and RX electrode using demultiplexer 212 and multiplexer 213. To improve performance, multiplexer 213 may also be segmented to allow more than one of the receive electrodes in matrix 225 to be routed to additional demodulation circuits, such as demodulation circuit 216. In an optimized configuration, where there is a 1-to-1 correspondence of instances of demodulation circuit 216 with receive electrodes, multiplexer 213 may not be present in the system.

When a conductive object, such as a finger, approaches the electrode matrix 225, the conductive object causes a decrease in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX signal 224 was applied at the time the decrease in capacitance was measured on the one or more receive electrodes.

By determining changes in the mutual capacitances associated with each intersection of electrodes in the matrix 225, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected, and the associated magnitude of capacitance change at each respective electrode.

The induced current signal is integrated by demodulation circuit 216. The rectified current output by demodulation circuit 216 can then be filtered and converted to a digital code by ADC 217.

A series of such digital codes measured from adjacent sensor intersections, when compared to or offset by the associated codes of these same sensors in an un-touched state, may be converted to touch coordinates indicating a position of a touch on sense array 121 by touch coordinate converter 218. The touch coordinates may then be used to detect gestures or perform other functions by the processing logic 102. Processing logic 102 may contain water rejection tool 120 as described above. The water rejection tool 120 of FIG. 2 can perform various operations described below with respect to FIGS. 4-10.

Electronic system includes capacitive button 123. In one embodiment, capacitive button 123 is connected to multiplexor 213.

Figure 3:
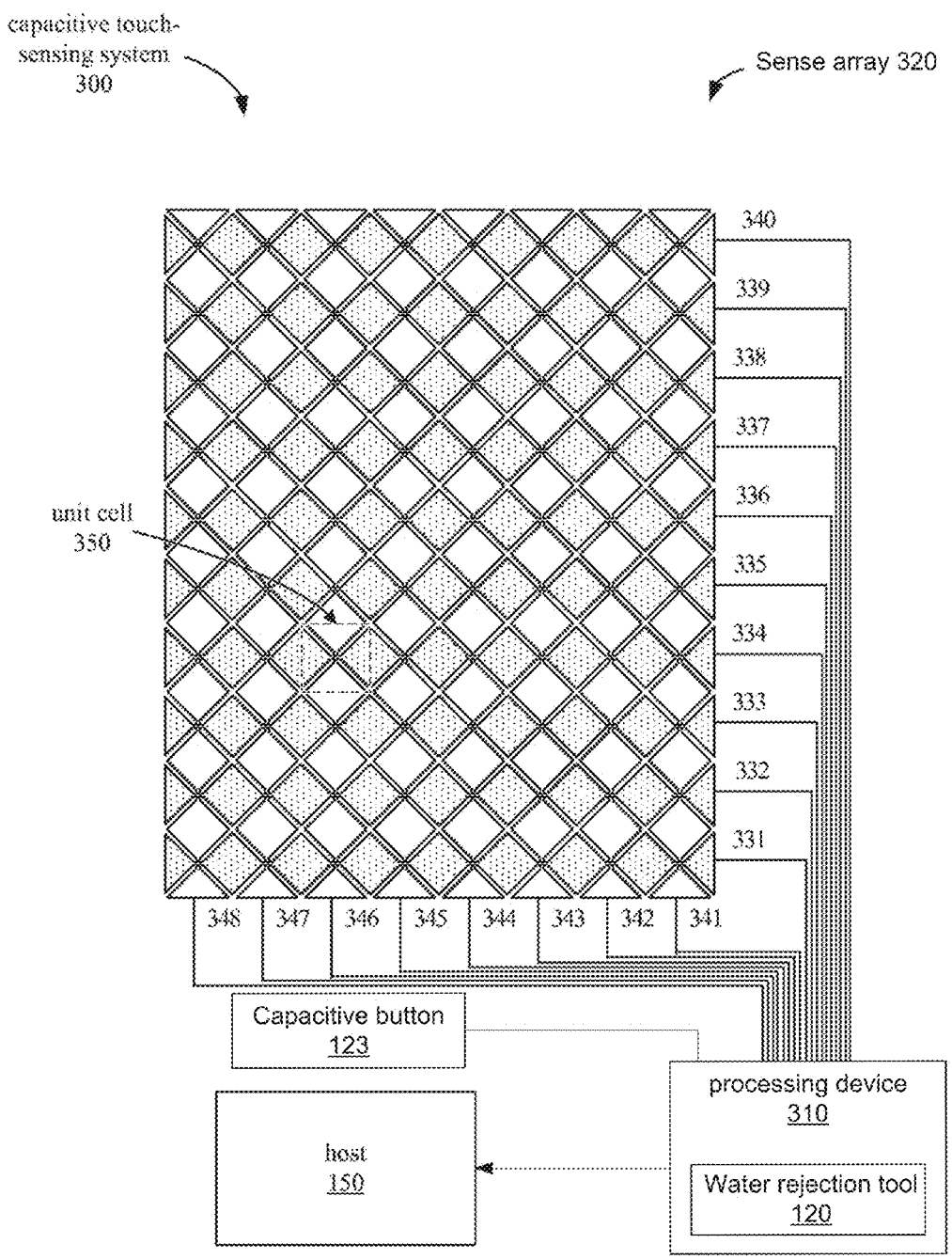
FIG. 3 illustrates a capacitive-sense touch-sensing system, according to one embodiment.

FIG. 3 illustrates a capacitive-sense touch-sensing system, according to one embodiment. Capacitive touch-sensing system 300 includes a sense array 320. Sense array 320 may be a capacitive-sense array. Sense array 320 includes multiple row electrodes 331-340 and multiple column electrodes 341-348. The row and column electrodes 331-348 are connected to a processing device 310, which may include the functionality of capacitance-sensing circuit 101, as illustrated in FIG. 1 or 2. In one embodiment, the processing device 310 may perform mutual capacitance measurement scans of the sense array 320 to measure a mutual capacitance value associated with each of the intersections between a row electrode and a column electrode in the sense array 320. The measured capacitances may be further processed to determine centroid locations of one or more contacts of conductive objects proximate to the sense array 320.

In one embodiment, the processing device 310 is connected to a host 150 which may receive the measured capacitances or calculated centroid locations from the processing device 310.

The sense array 320 illustrated in FIG. 3 includes electrodes arranged to create a pattern of interconnected diamond shapes. Specifically, the electrodes 331-348 of sense array 320 form a single solid diamond (SSD) pattern. In one embodiment, each intersection between a row electrode and a column electrode defines a unit cell. Each point within the unit cell is closer to the associated intersection than to any other intersection. For example, unit cell 350 contains the points that are closest to the intersection between row electrode 334 and column electrode 346.

In one embodiment, capacitive touch-sensing system 300 may collect data from the entire touch-sensing surface of sense array 320 by performing a scan to measure capacitances of the unit cells that comprise the touch-sensing surface, then process the touch data serially or in parallel with a subsequent scan. For example, one system that processes touch data serially may collect raw capacitance data from each unit cell of the entire touch-sensing surface, and filter the raw data. Based on the filtered raw data, the system may determine local maxima (corresponding to local maximum changes in capacitance) to calculate positions of fingers or other conductive objects, then perform post processing of the resolved positions to report locations of the conductive objects, or to perform other functions such as motion tracking or gesture recognition.

In one embodiment, capacitive touch-sensing system 300 may be configured to perform both of self-capacitance sensing and mutual capacitance sensing. In one embodiment, capacitive touch-sensing system 300 is configured to perform self-capacitance sensing, in sequence or in parallel, to measure the self-capacitance of each row and column electrode of the touch-sensing surface (e.g., sense array 320), such that the total number of sense operations is N+M, for a capacitive-sense array having N rows and M columns. In one embodiment, capacitive touch-sensing system 300 may be capable of connecting individual electrodes together to be sensed in parallel with a single operation. For example, multiple row (e.g., electrodes 331-340) and or column electrodes (e.g., electrodes 341-348) may be coupled together and sensed in a single operation to determine whether a conductive object is touching or near the touch-sensing surface. In an alternate embodiment, the capacitive touch-sensing system 300 may be capable of connecting each row electrode to it is own sensing circuit such that all row electrodes may be sensed in parallel with a single operation. The capacitive touch-sensing system 300 may also be capable of connecting each column electrode to its own sensing circuit such that all column electrodes may be sensed in parallel with a single operation. The capacitive touch-sensing system 300 may also be capable of connecting all row and column electrodes to their own sensing circuits, such that all row and column electrodes may be sensed in parallel with a single operation.

In one embodiment, the capacitive touch-sensing system 300 may perform mutual capacitance sensing of the touch-sensing surface (e.g., sense array 320) by individually sensing each intersection between a row electrode and a column electrode. Thus, a total number of sense operations for a capacitive-sense array (e.g., sense array 320) having X rows and Y columns is X×Y. In one embodiment, performing a mutual capacitance measurement of a unit cell formed at the intersection of a row electrode and a column electrode includes applying a signal (TX) to one electrode and measuring characteristics of the signal on another electrode resulting from the capacitive coupling between the electrodes.

In one embodiment, multiple capacitance-sensing circuits may be used in parallel to measure a signal coupled to multiple column electrodes simultaneously, from a signal applied to one or more row electrodes. In one embodiment, for a capacitive-sense array (e.g., sense array 320) having X rows, Y columns, and N columns that can be sensed simultaneously, the number of mutual capacitance sensing operations is the smallest whole number greater than or equal to X×Y/N.

In one embodiment, each update of the touch locations may include a sensing portion and a non-sensing portion. The sensing portion may include measurement of capacitance associated with intersections between electrodes, while the non-sensing portion may include calculation of touch locations based on the capacitance measurements and reporting of the calculated touch locations to a host device.

In one embodiment, capacitive touch-sensing system 300 includes capacitive button 123. Capacitive button 123 is connected to processing device 310.

Figure 4:
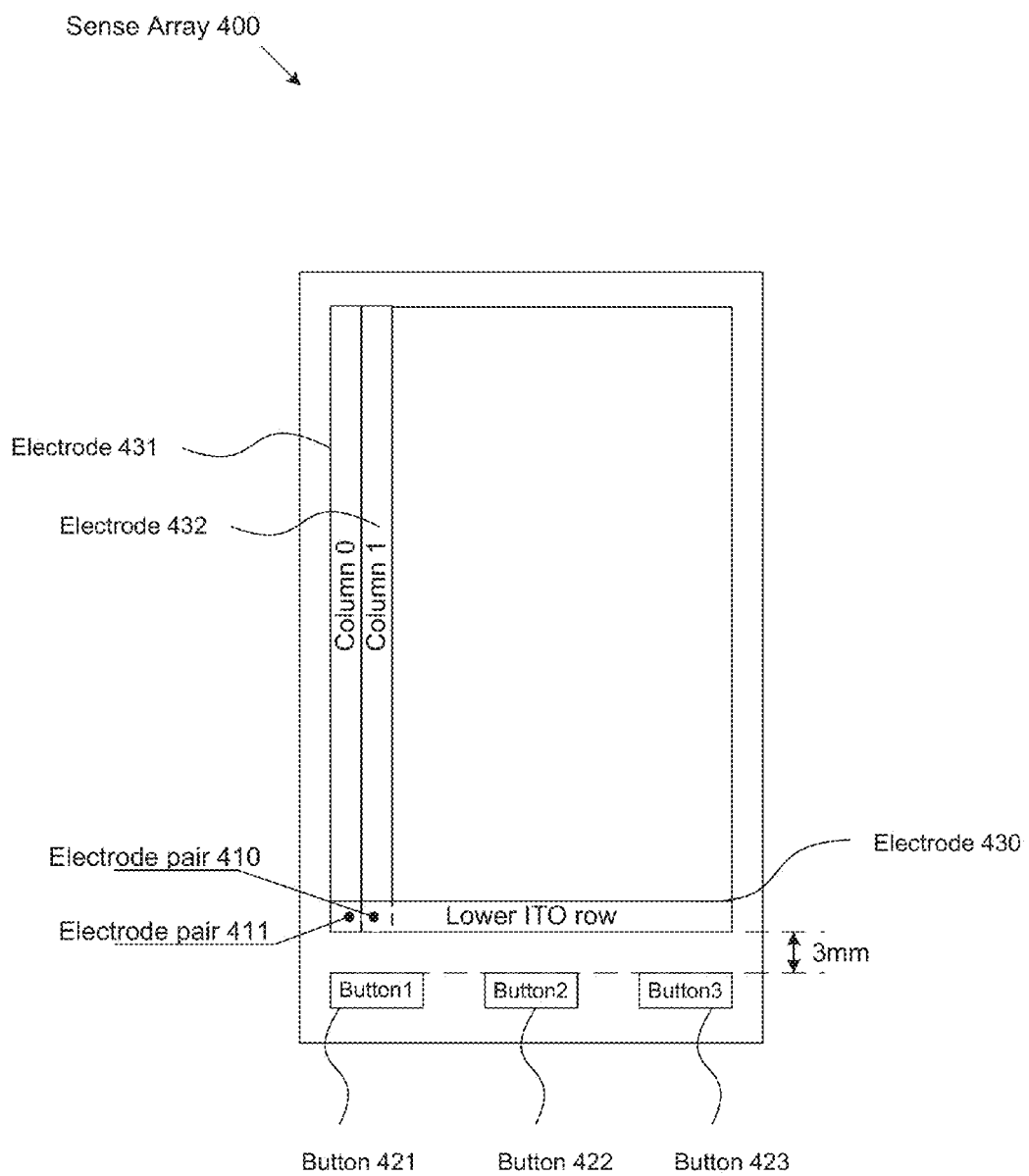
FIG. 4 illustrates a sense array including capacitive buttons, according to one embodiment.

FIG. 4 is an illustration of sense array including capacitive buttons, according to one embodiment. Sense array 400 contains button 421, button 422, and button 423 which may be capacitive buttons (e.g., mutual capacitance button and/or self-capacitance buttons). The capacitive buttons may be disposed on a substrate. The capacitive button may have a button electrode. The body of sense array 400 contains electrode 430, electrode 431, and electrode 432. A mutual capacitance electrode pair is illustrated by electrode pair 410 and electrode pair 411. The intersection of two electrodes forms a mutual capacitance electrode pair. For purposes of illustration, the intersection of electrode 432 and electrode 430 may form electrode pair 410, and the intersection of electrode 431 and electrode 430 may form electrode pair 411. In one embodiment, a capacitive button contains an electrode pair. During self-capacitance scanning, one of the electrodes of the electrode pair may be scanned. During mutual capacitance scanning, both electrodes of the electrode pair are scanned. In one embodiment, the capacitive button is a single electrode. When measuring mutual capacitance, the single electrode button may use another adjacent electrode, including another button, to complete the electrode pair. FIG. 4 illustrates a case where sense array body, illustrated by electrode 430 and electrode 431, may be measured as both a self-capacitance array and mutual capacitance array, and the buttons are measured as separate self-capacitance electrodes. It should be noted that the configuration disclosed in FIG. 4 is for purposes of illustration, and the present disclosure in not limited to the electrode configuration described in FIG. 4.

It should be noted that water on a sense array, for example, sense array 400, may increase the capacitance measurements of the electrodes directly submersed under the water. When water is present on a sense array, the water may increase the measured raw data and may appear to be a touch, when no touch is actually present (aka, false touch). From experiment, water on a capacitive button (e.g., button 421) strongly influences the raw data measurements of adjacent mutual capacitance electrode pairs (e.g., electrode pair 410 and electrode pair 411), but weakly influences the raw data measurements of adjacent self-capacitance electrodes (e.g., electrode 430). For example, if water is present on button 421, the system (e.g., electronic system 100) may have difficulty discerning if the raw data measured from button 421 represents a touch or represents a false touch due to water.

In one embodiment, water on a button may be differentiated from a touch on a button, for example, button 421. Electrode 430 may be scanned and self-capacitance measurements made. Additionally, electrode pair 410 and/or electrode pair 411 may be scanned and mutual capacitance measurements made. The self-capacitance measurement is compared to a self-capacitance threshold and the mutual capacitance measurements are compared to a mutual capacitance threshold. When a self-capacitance measurement is not greater than the self-capacitance threshold (determining the self-capacitance activation is false), and the mutual capacitance measurement is greater than the mutual capacitance threshold (determining the mutual capacitance activation is true)—a determination may be made that raw capacitance data indicates that water is on the button. It should be noted that the distance between the button 421 and the adjacent electrodes, electrode pair 410 and electrode 430, is pictured as 3 mm. The distance of 3 mm is used for purposes of illustration and the distance between a button and the adjacent electrodes may be more or less than 3 mm.

In one embodiment, the mutual capacitance electrode pair (e.g., electrode pair 411) from which a mutual capacitance activation is determined includes the electrode (e.g., electrode 430) from which the self-capacitance activation is determined. In another embodiment, the mutual capacitance electrode pair from which the mutual capacitance activation is determined does not include the electrode from which the self-capacitance activation is determined. In another embodiment, a capacitive button (e.g., button 421, button 422, and button 423) may be the electrode pair from which mutual capacitance activation is determined. In another embodiment, a capacitive button may be a single electrode of an electrode pair from which mutual capacitance activation is determined. In one embodiment, a capacitive button is the self-capacitance electrode from which the self-capacitance activation is determined. In another embodiment, a touch may be detected even though the capacitive buttons are covered in water. As will be explained below, when water is detected on a capacitive button, processing logic determines a water touch detection threshold. When capacitance measurements on the capacitive button exceed the water touch detection threshold, a touch is registered. When capacitance measurements on the capacitive button are lower than the water touch detection threshold, no touch is registered.

In one embodiment, a touch on sense array 400 produces raw capacitance data. The raw data may be produced for self-capacitance electrodes and mutual capacitance electrode pairs. The raw data may be represented as counts or points. For example, a touch on electrode pair 410 may produce a count of 170. When no touch is present on the sense array, raw data is still produced. For example, when no touch is present on electrode pair 410, raw data may still register a count of 100. Raw capacitance data originating from an electrode or electrode pair (as provided by, for example, processing device 110) absent the presence of a touch may be considered a baseline or baseline value. Baseline values may be stored at different times, such as at initial start-up and dynamically during the use of the sense array. In the previous example, the count of 100 may be the baseline value because it is the raw capacitance data value when no touch is present. In one embodiment, at initialization of sense array 400, the sense elements are scanned and a baseline value is determined and stored in memory.

In another embodiment, a touch on a sense array by a touch object, such as a finger, raises the measured capacitance at the touch location above the baseline value. For example, a touch on the sense array may raise the touch measurement from a baseline count of 100 to 170. In one embodiment, in order to register a touch, a button threshold is added to the initial baseline value to calculate a touch detection threshold. For example, if the initial baseline value is 100 and the button threshold is 60, then the touch detection threshold is 160 counts. Any capacitance measurement on the capacitance button over 160 counts is rendered by the sensing system as a touch. The touch threshold value may be arbitrary, determined by experiment, the designer, or by a user calibrating his or her touch device.

When water covers a capacitive button, the raw capacitance data significantly increases. As a consequence, the raw data from water on a sense electrode may appear to be a touch, when no touch is present, and register a false touch. However, at a certain point additional water does not significantly increase the measured raw capacitance value. For example, a small drop of water on a capacitive button may raise the measured capacitance value from an initial baseline count of 90 counts to 120 counts. A second drop of water may increase the measured capacitance to 150 counts, while a third drop of water increases the measured capacitance to 160 counts, and a fourth drop of water increasing the measured capacitance slightly to 162 counts. After the third drop of water, additional water only slightly affects the measured capacitance values on a capacitive button. The initial baseline value changes from 120 counts to a water baseline value of approximately 160 counts. When water is detected, the baseline may be changed from the initial baseline value, for example 90 counts, to a water baseline value, for example 160 counts. For purposes of illustration, FIGS. 11 and 12 have been provided.

Figure 12:
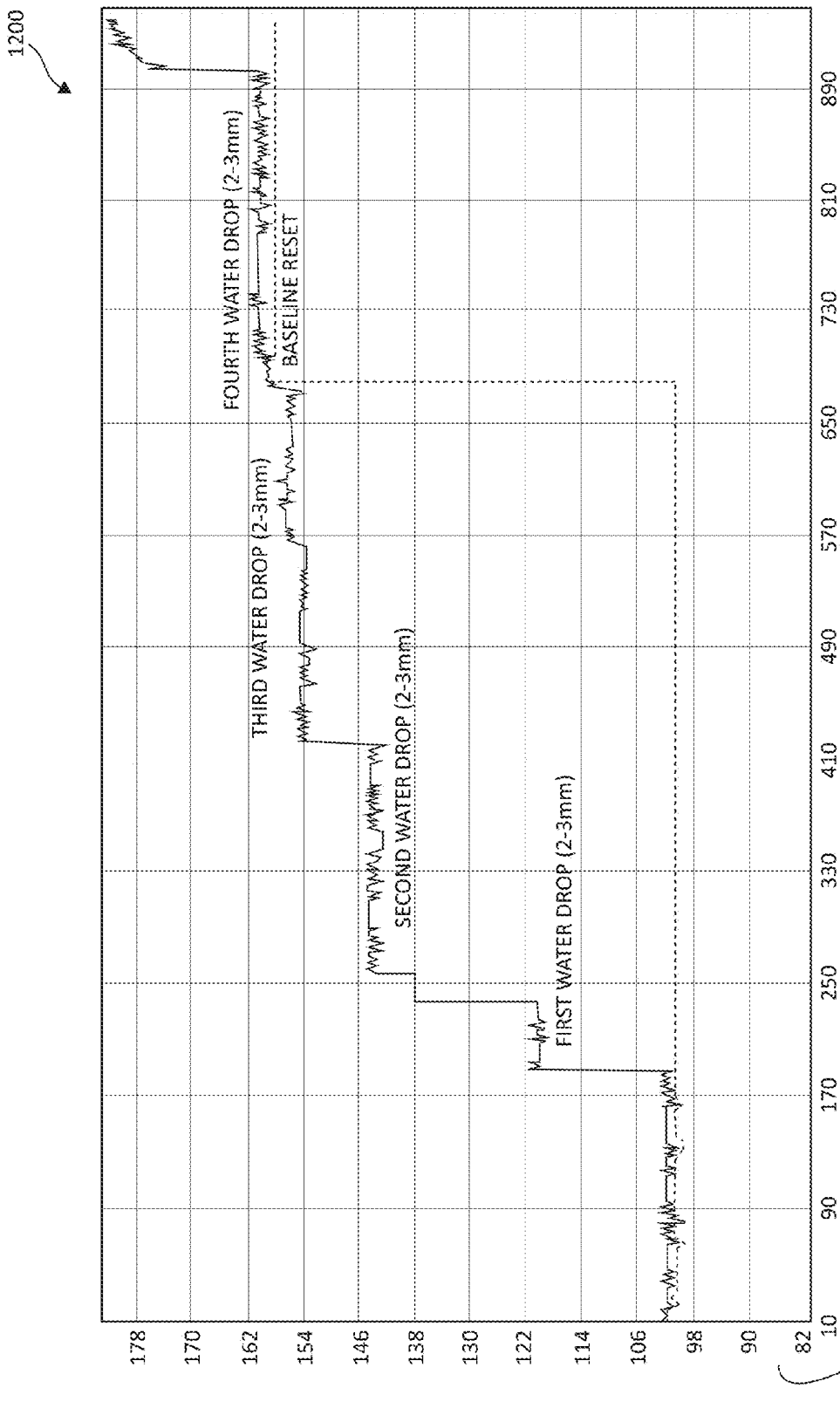
FIG. 12 is a graph illustrating capacitance measurements of a capacitive button under different conditions, according to one embodiment.

When water covers a capacitive button and is touched by a touch object, the raw capacitance data increases, but not at the same magnitude as a touch absent water. For example, at a baseline of 100 counts, a touch on a dry capacitive button may increase the capacitance measurement by 70 counts, to a total of 170 counts. In dry conditions, a button threshold of 60 points may allow the detection of a touch (e.g., 170>100+60). When the button or finger is wet, a touch may only increase the baseline level by, for example, 15 points. In order to detect a touch when water is present on the button, the button threshold of 60 counts, may be reset to a water threshold of, for example, 15. FIG. 12 is provided for purposes of illustration.

In one embodiment, when water is detected on a capacitive button, the touch detection threshold is changed. With no water present, the initial baseline value and the button threshold are added together to form the touch detection threshold. For example, with an initial baseline value of 100 and a button threshold value of 60, the touch detection threshold is 160 counts. Any capacitance measurement, when no water is detected, that is above 160 counts is registered as a touch. When water is detected on the button, the touch detection threshold is reset to the water touch detection threshold. The water touch detection threshold includes the water baseline value and the water threshold. For example, the water baseline value is 160 counts and the water threshold value is 15 counts, and the water touch detection threshold is 175 counts. When water is detected on the button, a capacitance measurement of the button above 175 counts may be registered as touch. It should be noted that the button and water threshold values may include additional values or terms that compensate for hysteresis in capacitance measurements (e.g. button hysteresis value). It also should be noted that the water baseline value may change as the amount of water on the capacitive button fluctuates. The water baseline value may be dynamically determined by measuring capacitance of the capacitive button with water but absent a touch object.

In another embodiment, additional button conditions may be determined by comparing measurements of adjacent self-capacitance and mutual capacitance electrodes to their respective thresholds. No touch may be determined when a self-capacitance measurement is not greater than the self-capacitance threshold (i.e., self-capacitance activation is false) and the mutual capacitance measurement is not greater than the mutual capacitance threshold (i.e., mutual capacitance activation is false). In one embodiment, if both the self-capacitance activation is true and the mutual capacitance activation is true (i.e., self-capacitance measurement is greater than the self-capacitance threshold, and mutual capacitance measurement is greater than the mutual capacitance threshold), then it may be determined that a fat finger is touching the button and the touch area covers the bottom side of the panel or a wet finger is touching the bottom of the panel. In another embodiment, if the self-capacitance activation is true and the mutual capacitance activation is false (i.e., self-capacitance measurement is greater than the self-capacitance threshold, and mutual capacitance measurement is less than the mutual capacitance threshold), the condition is undefined.

The conditions are summarized in the below table:

| Signals conditions | Description |
| --- | --- |
| Self-cap measurement < Self-cap threshold and Mutual cap measurement < Mutual cap threshold | No touch. |
| Self-cap measurement < Self-cap threshold and Mutual cap measurement > Mutual cap threshold | There is water on the button. |
| Self-cap measurement > Self-cap threshold and Mutual cap measurement > Mutual cap threshold | Fat Finger is touching the button and touch area covers bottom side of the panel. Or a wet finger is touching the bottom of the panel. The wet finger detection algorithm is described above |
| Self-cap measurement > Self-cap threshold and Mutual cap measurement < Mutual cap threshold | Not a defined condition. |

The following methods (method 500, 600, 700, 800, and 1000) may be performed by processing logic (e.g., processing logic 102) that may include hardware (circuitry, dedicated logic, etc.), software (such as is run on a general purpose computing system or a dedicated machine), firmware (embedded software), or any combination thereof. In one embodiment, the processing device 110 performs some or all of each method disclosed above. In another embodiment, water rejection tool 120 performs some or all of each method. In another embodiment, the host 150 performs some or all of the operations each method. Alternatively, other components of the electronic system 100 or electronic system 200 perform some or all of the operations of each method.

Figure 5:
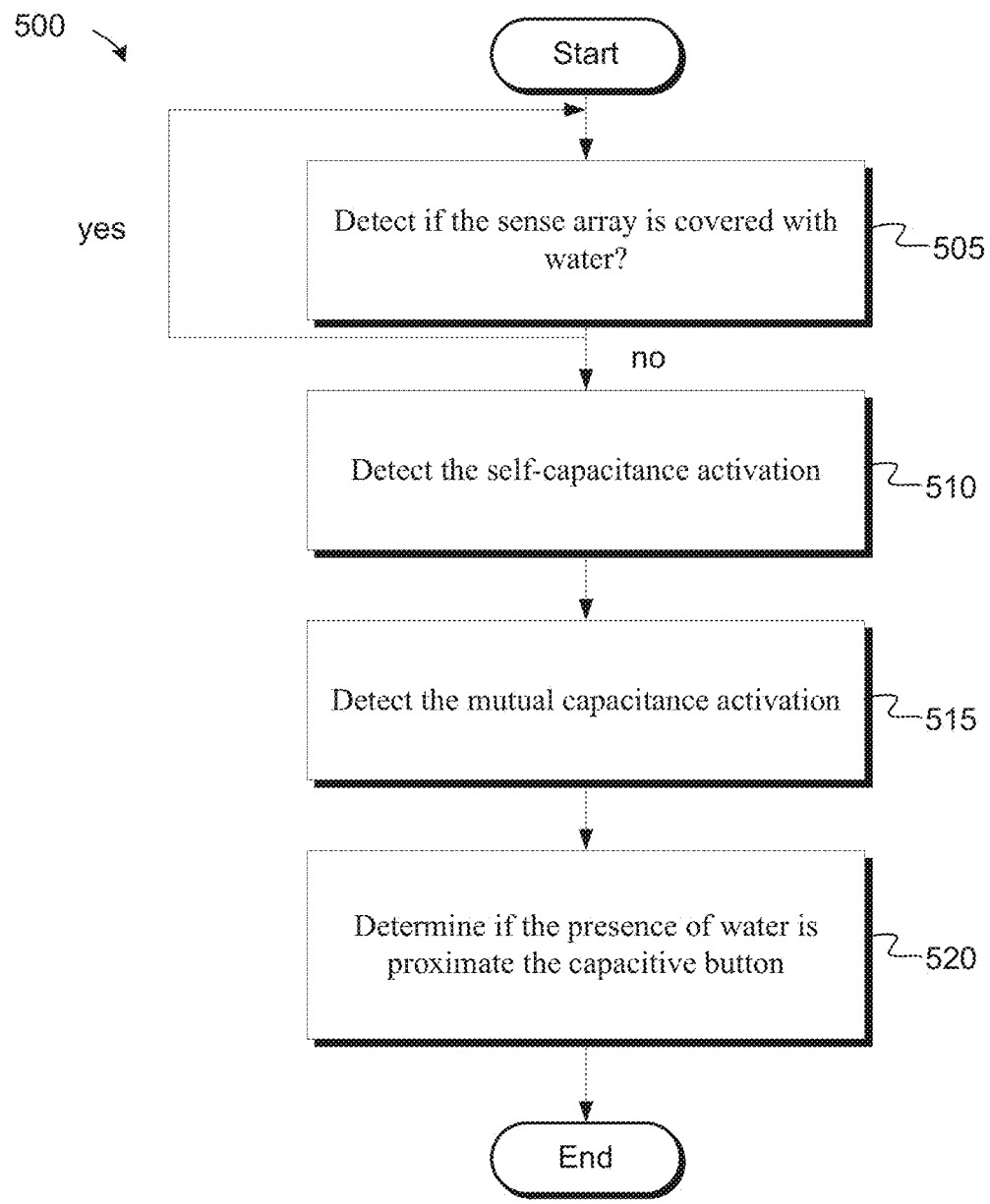
FIG. 5 is a flowchart of a method illustrating water detection on capacitive buttons, according to one embodiment.

FIG. 5 is a flowchart of a method illustrating water detection on capacitive buttons, according to one embodiment. Method 500 begins at block 505 where processing logic detects if the sense array (e.g., sense array 121) is covered with water. If the sense array is covered with water, processing logic may determine not to detect a touch. Water may cover the sense array to such an extent that measuring a touch becomes impractical or unnecessary. In one embodiment, the sense array may be entirely covered with water. In another embodiment, the sense array is partially covered with water. In one embodiment, more than half the sense array is covered with water. Covered with water may mean that a film of water covers the sense array. The amount of water that constitutes covered with water may be any amount of water that affects the capacitance measurements of the sense array. In one embodiment, in order to detect if the sense array is covered with water, processing logic uses a self-capacitance scan method. It should be noted that capacitance measurements of a self-capacitance electrode submersed under water are much greater than the capacitance measurements from a dry finger. The self-capacitance scan method may scan three different self-capacitance electrodes. If all the capacitance measurements of the self-capacitance measurements are significantly higher than measurements of a touch, the sense array is covered under water and detection of a touch is unnecessary. In one embodiment, the middle horizontal and top and bottom horizontal electrodes are scanned. In another embodiment, the middle vertical electrode and the vertical electrodes for both edges are scanned. It should be noted that any number of self-capacitance electrodes in any combination may be scanned to detect if water is covering the sense array.

If sense array is not covered with water, method 500 continues to block 510 where processing logic detects a self-capacitance activation in view of a self-capacitance measurement of an electrode. As described in FIG. 4, processing logic determines if water is on the capacitive button. Detecting the self-capacitance activation helps indicate if water is on the capacitive button by comparing a self-capacitance measurement of an electrode adjacent the capacitive button to a self-capacitance threshold. For example, using FIG. 4 for purposes of illustration, processing logic measures the self-capacitance of electrode 430 and compares the capacitance measurement to the self-capacitance threshold (e.g., 10 counts). It should be noted that the self-capacitance measurement may or may not include the baseline value. When the self-capacitance measurement is greater than the self-capacitance threshold, the self-capacitance activation is true. When the self-capacitance measurement is less than or equal to the self-capacitance threshold, the self-capacitance activation is false. In one embodiment, a single self-capacitance electrode is measured. In another embodiment, multiple electrodes may be measured to determine a single measurement. In an alternative embodiment, multiple self-capacitance electrodes may be measured and multiple self-capacitance measurements obtained.

Method 500 continues to block 515 where processing logic detects the mutual capacitance activation in view of a mutual capacitance measurement of a pair of electrodes. It should be noted that mutual capacitance detection uses a TX electrode and an RX electrode. The TX/RX pair may be considered a pair of electrodes. In order to detect a mutual capacitance activation in view of a mutual capacitance measurement, processing logic compares the mutual capacitance measurement of a pair of electrodes to a mutual capacitance threshold. For example, using FIG. 4 for purposes of illustration, processing logic measures the mutual capacitance of electrode pair 410 and/or electrode pair 411 and compares the measurement to the mutual capacitance threshold (e.g., 15 counts). When the mutual capacitance measurement is greater than the mutual capacitance threshold, the mutual capacitance activation is true. When the mutual capacitance measurement is less than or equal to the mutual capacitance threshold, the mutual capacitance activation is false. In one embodiment, a single pair of mutual capacitance electrodes is measured. In another embodiment, multiple pairs of mutual capacitance electrodes may be measured to determine a single measurement. In an alternative embodiment, multiple pairs of mutual capacitance electrodes may be measured to obtain multiple capacitance measurements. It should be noted that the mutual capacitance electrode may be adjacent the capacitive button.

Method 500 continues to block 520 where processing logic determines the presence of water proximate to the capacitive button. It may be determined that water is proximate to the capacitive button when the self-capacitance activation is false and the mutual capacitance activation is true. In another embodiment, when both the self-capacitance activation and the mutual capacitance activation are false, processing logic determines there is no touch. In one embodiment, when both the self-capacitance activation and the mutual capacitance activation are true, processing logic determines that the state is undefined. In another embodiment, when the self-capacitance activation is true, and the mutual capacitance activation is false, processing logic determines that a fat finger is touching the button and the touch area covers the edge of the panel or a wet finger is touching the edge of the panel as described in FIG. 8.

Figure 6:
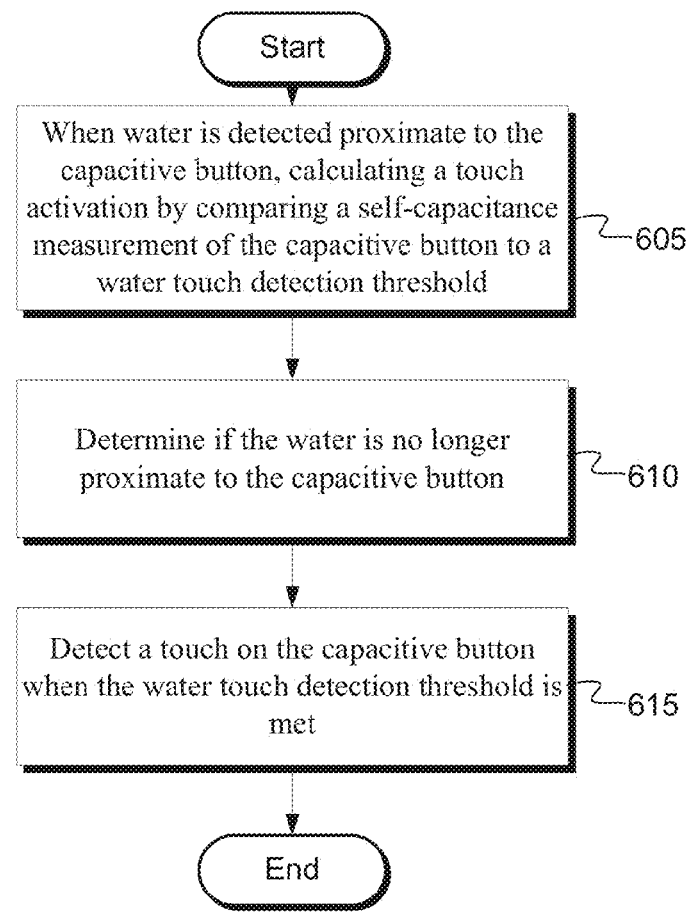
FIG. 6 is a flowchart of a method illustrating the detection of a touch when the presence of water is detected proximate to a capacitive button, according to one embodiment.

FIG. 6 is a flowchart of a method illustrating the detection of a touch when the presence of water is detected proximate to the capacitive button, according to one embodiment. In one embodiment, the detection of water is performed by the method 500 presented in FIG. 5. Method 600 begins at block 605 where processing logic calculates a touch activation by comparing a self-capacitance measurement of the capacitive button to a water touch detection value, when water is detected proximate to the capacitive button. In one embodiment, the water touch detection threshold is the minimum measured capacitance value in which processing logic will register a touch for the capacitive button when water is detected proximate to the capacitive button. In one embodiment, the water touch detection threshold includes the water baseline value and the water threshold. It should be noted that the water baseline value may dynamically change. In one embodiment, processing logic resets an initial baseline value with a water baseline value, and resets the button threshold with the water threshold. In one embodiment, switching between the button threshold and the water threshold may be implemented by a waterFlag (i.e., water flag). If the waterFlag is set to logical "1," the water threshold is used. The waterFlag may be set to logical "1" when water is detected on the buttons. When there is no water on the button or the water has been removed, the water flag may be set to logical "0." The water baseline value and water threshold are described in more detail in FIG. 4 and FIG. 7.

Method 600 continues to block 610 where processing logic determines if the water is no longer proximate to the capacitive button. Processing logic may differentiate if water has been completely removed or simply decreased. Processing logic may store capacitance measurements of the button after initialization and compare the initial capacitance measurements with the current baseline. Baselines reset when water is detected (e.g., water baseline value), and reset to the capacitance value measured at the capacitive button when under water. When the buttons are cleared of water, the baselines significantly decrease or return to the capacitance values initially measured. Processing logic may implement a conditional block to detect if water on the button has been removed. For example, processing logic may compare the current baseline (abWotBaseline) to the initial measured capacitance values of the capacitive button (Btn_Init_Raw) plus a fraction of button threshold (Divider*Button Threshold) (Condition: Btn_Init_Raw+Divider*Button Threshold<abWotBaseline). If the condition is false, water has been removed from the button. If the condition is true, water is still on the button. In one example, the button threshold is 49, the initial measured capacitance value is 104, the current baseline is 160 counts, and the divider is ⅔. The condition may be described as follows: Btn_Init_Raw+⅔*Button threshold< abWotBaseline (104+⅔*49<160). When the condition is false, water has been removed from the capacitive button. When the condition is false, the waterFlag may be set to logical "0" and processing logic may use button threshold. When the condition is true, processing logic determines that a touch may be detected using water threshold.

In another embodiment, water may decrease slowly and the corresponding measured capacitance also decreases slowly. In such a case, (e.g., abWotBaseline=136) the above condition will be false and a touch may not be detected. For example, in the above example when abWotBaseline=136, the condition will be false and the button threshold will be used instead of the water threshold. The button threshold (e.g., 49 counts) may be significantly greater than water threshold (e.g., 7 counts). Measured capacitance of touch may be 175 counts and the water detection value may be 185 (water baseline value (136)+button threshold (49)=185)— hence a touch may not be detected. In such a case, processing logic may change the divider to a second divider (e.g., divider2), which is a lower value than divider (e.g., ¼). For example, by using the second divider, Divider2 (e.g., Divider2=¼), when the above condition (i.e., condition "Divider") is false the new condition is as follows: (Btn_Init_Raw+Divider2*Button Threshold)<abWotBaseline (e.g., (104+¼*49)<136). When the Divider2 condition is true, water threshold may be changed to WaterThreshold2 which may greater than Water Threshold (e.g., 20 counts). For example, when the measured capacitance data from a touch is 175 counts it may be compared to updated water detection value (water baseline value+water threshold2 (136+20=156)). 175 counts is greater than the updated water detection value of 156 counts, and a touch is detected. When the Divider2 condition is false, water threshold may be changed back to button threshold (e.g., 49 counts) and the water detection value changes to water baseline value+button threshold.

Method 600 continues to block 615 where processing logic detects a touch on the capacitive button when the water touch detection threshold is met. In one embodiment, processing logic determines if the touch activation is true or false. When the capacitance measurement of the capacitive button is greater than the water touch detection threshold, the touch detection threshold is met, the touch activation is true and a touch is detected. When the capacitance measurement of the capacitive button is less than the water touch detection threshold, the touch detection threshold is not met, the touch activation is false and no touch is detected.

Figure 7:
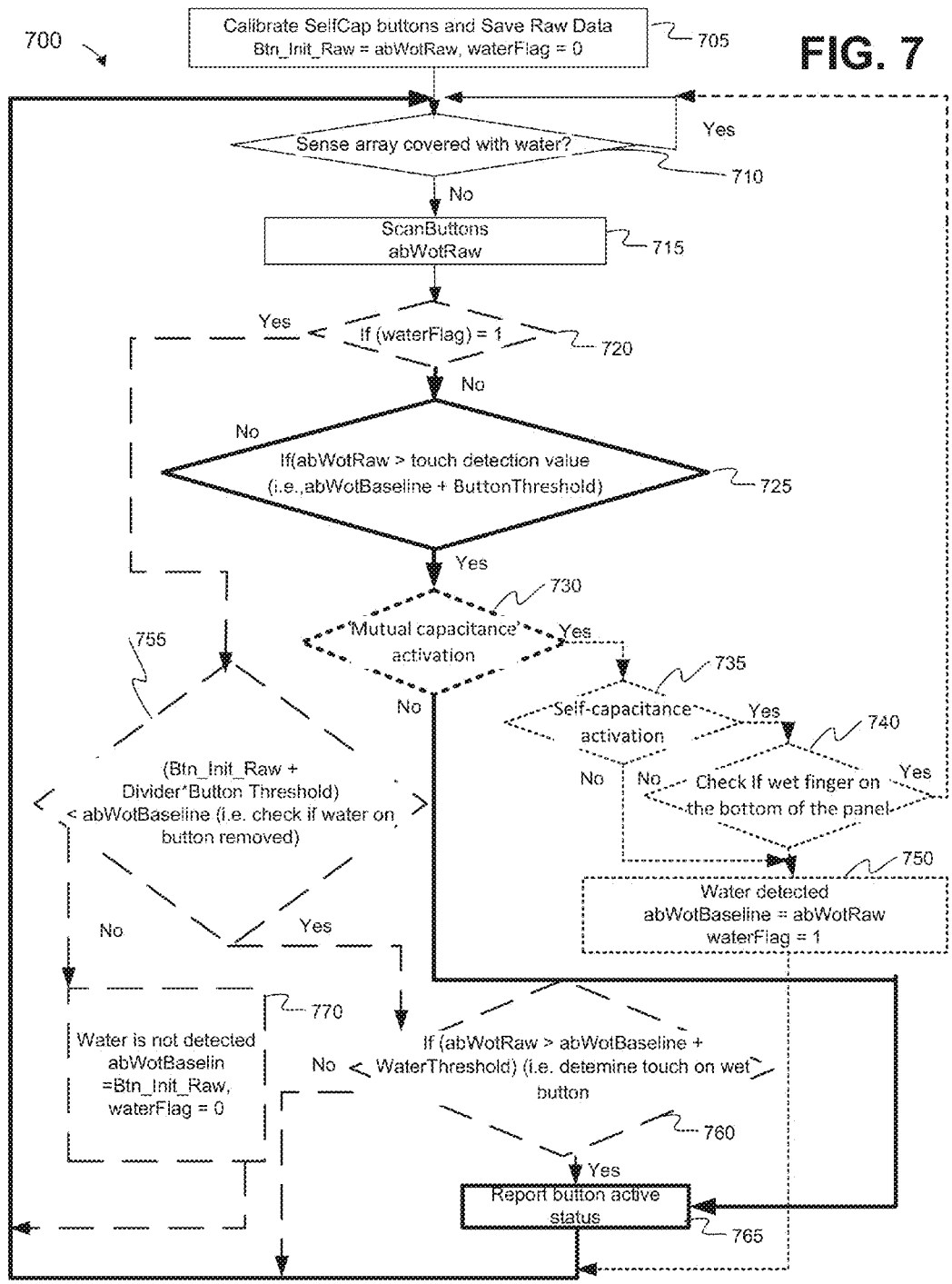
FIG. 7 is a flowchart of a method illustrating the detection of a touch when the presence of water is detected proximate to the capacitive button, according to another embodiment.

FIG. 7 is a flowchart of a method illustrating the detection of a touch when the presence of water is detected proximate to the capacitive button, according to another embodiment. Method 700 begins at block 705 where processing logic calibrates the capacitive buttons. In one embodiment, the capacitive buttons are scanned and the capacitance measurements are recorded. The scan may be at power-on and record the initial capacitance measurements. In another embodiment, the raw capacitance data (e.g., abWotRaw) may be saved as the button's initial raw capacitance value (e.g., Btn_Init_Raw=abWotRaw). The button initial raw capacitance value may be set as the initial baseline value. The waterFlag may be set to logical "0" (e.g., waterFlag=0).

Method 700 continues to block 710 where processing logic determines if the sense array (e.g., sense array 121) is covered with water and detecting a touch is unnecessary. Water may cover the sense array to such an extent that measuring a touch becomes impractical or unnecessary. In one embodiment, in order to detect if the sense array is covered with water, processing logic uses a self-capacitance scan method. It should be noted that capacitance measurement of a self-capacitance electrode submersed under water is much greater than the capacitance measurements from a dry finger. The self-capacitance scan method may scan three different self-capacitance electrodes. If all the capacitance measurements of the self-capacitance measurements are significantly higher than measurements of a touch, the sense array is covered under water and detection of a touch is unnecessary. In one embodiment, the middle horizontal and top and bottom horizontal electrodes are scanned. In another embodiment, the middle vertical electrode and the vertical electrodes for both edges are scanned. It should be noted that any number of self-capacitance electrodes in any combination may be scanned for capacitance measurements in order to detect if water is covering the panel.

Method 700 continues to block 715 where processing logic scans the capacitive buttons to obtain capacitance measurements for the capacitive buttons. The measurements may be raw capacitance data and described as counts or points. The measured capacitance values may be stored by processing logic. In one embodiment, the measured capacitance values are stored as the variable abWotRaw.

Method 700 continues to block 720 where processing logic checks if the waterFlag is set to logical "0" or "1." When waterFlag is true—logical "1," processing logic moves to block 755. When waterFlag is false—logical "0," processing logic moves to block 725. One implementation of the waterFlag is described in FIG. 6. In one implementation, the waterFlag is initially set to logic "0" at initialization, as described in block 705. When water is detected on the capacitive buttons, processing logic sets waterFlag to logical "1," as described by block 750. The waterFlag may be reset to logical "0" when water is no longer detected on the capacitive button, as described in block 770.

Method 700 continues to block 725, when processing logic determines that waterFlag is set to logical "1," indicating that no water has been detected on the capacitive button. In one embodiment, in block 725 processing logic compares the raw capacitance data (i.e., abWotRaw) obtained in block 715 to the touch detection threshold (e.g. abWotBaseline+Button Threshold). The touch detection threshold includes the baseline value (i.e., abWotBaseline) plus the button threshold. The button threshold may include a button hysteresis value. Button hysteresis value may add additional counts (e.g. 3 to 7 counts) to the button threshold to account for hysteresis in capacitance measurements at the capacitive buttons. It should be noted that the baseline value (i.e., abWotBaseline) may be set to the initial capacitance measurements of the button (i.e., Btn_Init_Raw), as described in block 705. If the raw capacitance value is less than the touch detection threshold, no touch is detected. If the raw capacitance value is greater than the touch detection threshold, a touch is detected, and method 700 proceeds to block 730.

Method 700 continues to block 730 where processing logic determines the mutual capacitance activation. In one embodiment, processing logic determines the mutual capacitance activation by comparing the mutual capacitance measurement of a pair of electrodes to the mutual capacitance threshold, as described in FIG. 5. If the mutual capacitance activation is true (i.e., the mutual capacitance measurement>mutual capacitance threshold) processing logic moves to block 765. If the mutual capacitance activation is false (i.e., the mutual capacitance measurement<or =mutual capacitance threshold), processing logic moves to block 735.

Method 700 continues to block 735 where processing logic determines the self-capacitance activation. In one embodiment, processing logic determines the self-capacitance activation by comparing the self-capacitance measurement of an electrode to the self-capacitance threshold, as described in FIG. 5. If the self-capacitance activation is true (i.e., the self-capacitance measurement>self-capacitance threshold) processing logic moves to block 740. If the self-capacitance activation is false (i.e., the self-capacitance measurement<or =self-capacitance threshold) processing logic moves to block 750. It should be noted that if the mutual capacitance activation is true (see, block 730) and the self-capacitance activation is false, then water is detected on the button, as described in FIG. 5.

Method 700 continues to block 740, where processing logic determines if there is a wet finger on the bottom of the panel. If processing logic determines that a wet finger is on the bottom of the panel, method 700 returns to block 710. If processing logic determines that no wet finger is on the bottom of the panel, method 700 continues to block 750.

In block 750 of method 700, processing logic determines that water has been detected on a capacitive button and resets the baseline value to the water baseline value (i.e., abWotBaseline=abWotRaw) and sets the waterFlag to logical "1." The value of water baseline value (i.e., abWotBaseline) is the measured capacitance of the button as described in block 715.

In block 755 of method 700, processing logic determines if the water on the capacitive button has been removed. Processing logic compares the initial measured capacitance of the button (Btn_Init_Raw) obtained in block 705 added to the product of the button threshold and a divider to the water baseline value (abWotBaseline) as described in block 750 (condition=Btn_Init_Raw+Divider*Button Threshold<abWotBaseline). When the condition is true (Btn_Init_Raw+Divider*Button Threshold<abWotBaseline), water has not been removed and processing logic proceeds to block 770. When the condition is false, water has been removed and processing logic proceeds to block 760. Processing logic determines if water on the capacitive button has been removed or has slightly decreased is described in more detail in regards to FIG. 6.

Method 700 continues to block 760, where processing logic determines if a touch occurred on a capacitive button when water is detected proximate to the capacitive button. Processing logic compares the measured capacitance of the capacitive button (AbWotRaw) obtained in block 715 to water touch detection threshold. The water touch detection threshold is the water baseline value (abWotBaseline) added to the water threshold. The condition may be described as follows—abWotRaw>abWotBaseline+Water Threchold. When the condition is false, no touch is detected. When the condition is true, a touch is detected, and processing logic proceeds to block 765. Determining a touch on a capacitive button when water is detected proximate to the capacitive button is further described in FIG. 6.

Method 700 continues to block 765 where processing logic reports that a touch has been sensed on the capacitive button.

At block 770 of method 700, when water has been removed from the capacitive button as described in block 755, processing logic changes waterFlag to logical "0." Processing may also reset the baseline (i.e., abWotBaseline) to the initial measured capacitance (Btn_Init_Raw) obtained in block 705. It should be noted that different baseline update algorithms may be used.

Figure 8:
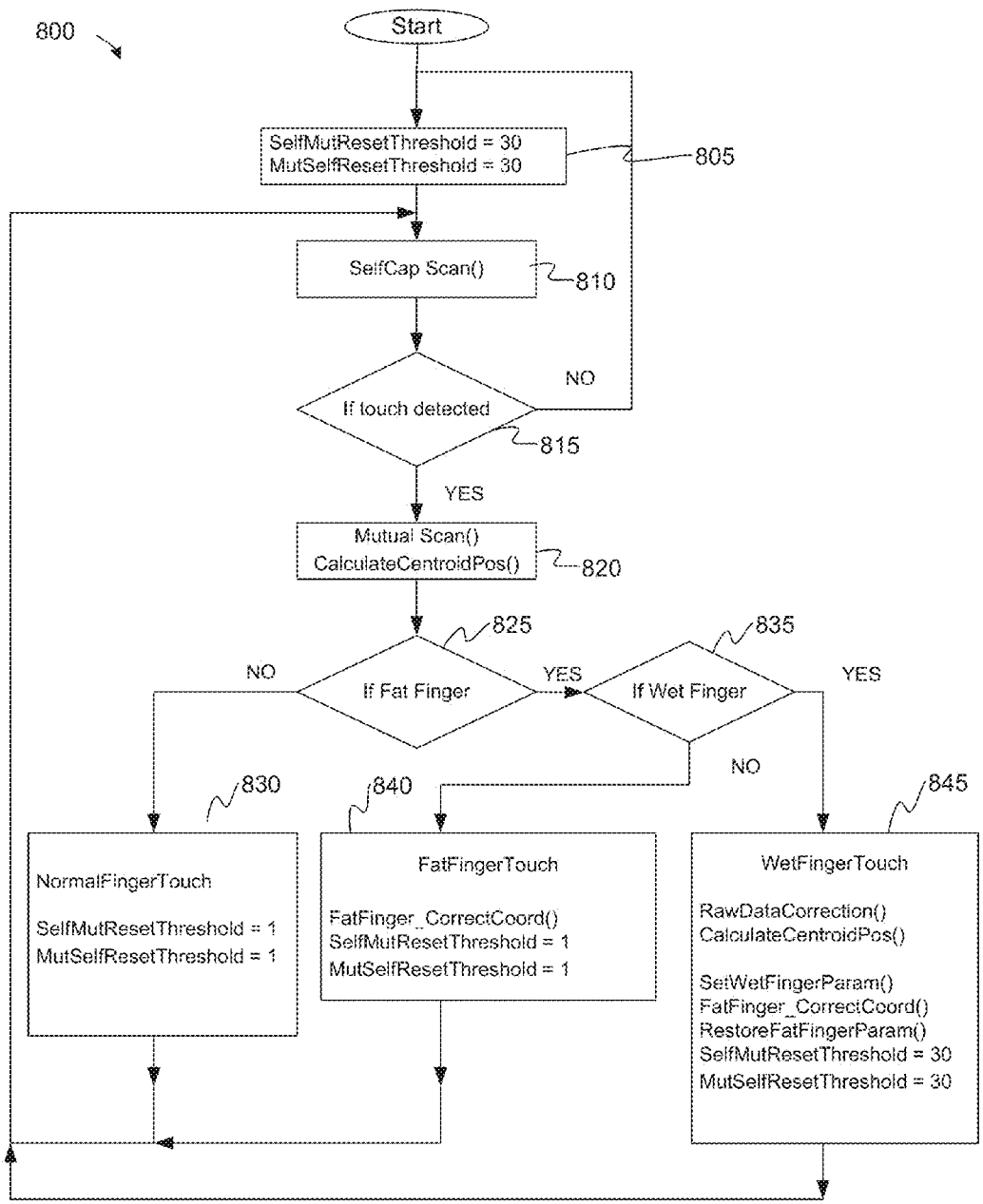
FIG. 8 flowchart of a method illustrating the detecting different touch types, including a wet finger touch, according to one embodiment.

FIG. 8 flowchart of a method illustrating the detecting of different touch types, including a wet finger touch, according to one embodiment. It should be noted that wet finger includes a wet finger touching a sense array and a dry or wet finger touching a wet sense array. The parameters for detecting a touch on a dry sense array may not be able to detect a touch with a wet finger or a water layer on the sense array. Standard techniques for detecting a touch on a sense array include a normal touch and a fat finger touch. When a sense array is touched by a wet finger, the active sensor area is significantly greater than that of a fat finger. As a result, the increased active sensor area causes significant jittering of the calculated XY position and often is recognized as two normal fingers. Using different settings for dry and wet panels and dynamically switching between the settings helps detect touches in various conditions, including wet finger touches. To support detecting touches of a wet finger, processing logic recognizes a wet finger is on the panel. Recognizing that a wet finger is on the panel helps to correctly handle the scanned signals and selecting the appropriate processing technique. The processing techniques include techniques for three types of touches: normal finger, fat finger touch, and wet finger touch. Real time detection of the touch type allows processing logic to dynamically change the parameters of for example, a centroid algorithm for detecting a touch, and change the signal processing to improve the precision of the position calculations Different types of touches create different types of sensor signals. For example, a touch by a 9 mm normal finger on a sense array may activate 5 adjacent cells (see FIG. 13A). A touch by a larger finger, for example 18 mm fat finger may activate 13 adjacent cells (see FIG. 13B). A touch by a 22 mm fat finger may activate 20 adjacent cells. Activate a cell means that the measured capacitance is above a threshold value (e.g., 30 counts). A touch by a 9 mm wet finger may activate 29 adjacent cells (see FIG. 13C).

Method 800 begins at block 805 where processing logic sets the threshold values of SelfMutResetThreshold and MutSelfResetThreshold. For example, both threshold values may be set to 30.

Method 800 continues to block 810 where processing logic performs a self-capacitance scan (SelfCap Scan( )) of the sense array (e.g. sense array 121). The self-capacitance measurements may be stored in memory. In block 815, if no touch is detected processing logic returns to block 805. If processing logic detects a touch, processing logic moves to block 820. At block 820, processing logic performs a mutual capacitance scan (Mutual Scan ( )) of the sense array. Processing logic further calculates the XY position for a normal finger (CalculateCentroidPos( )). At block 825 processing logic determines if the touch is by a fat finger. If the touch is not by a fat finger, processing logic performs block 830 and determines that the touch is of a normal finger and resets the threshold values of SelfMutResetThreshold and MutSelfResetThreshold. For example, both threshold values may be set to 1. Processing logic may determine the XY coordinates of the touch as performed in block 820. If the touch meets the criteria of a fat finger touch, processing logic moves to block 835.

Figure 9:
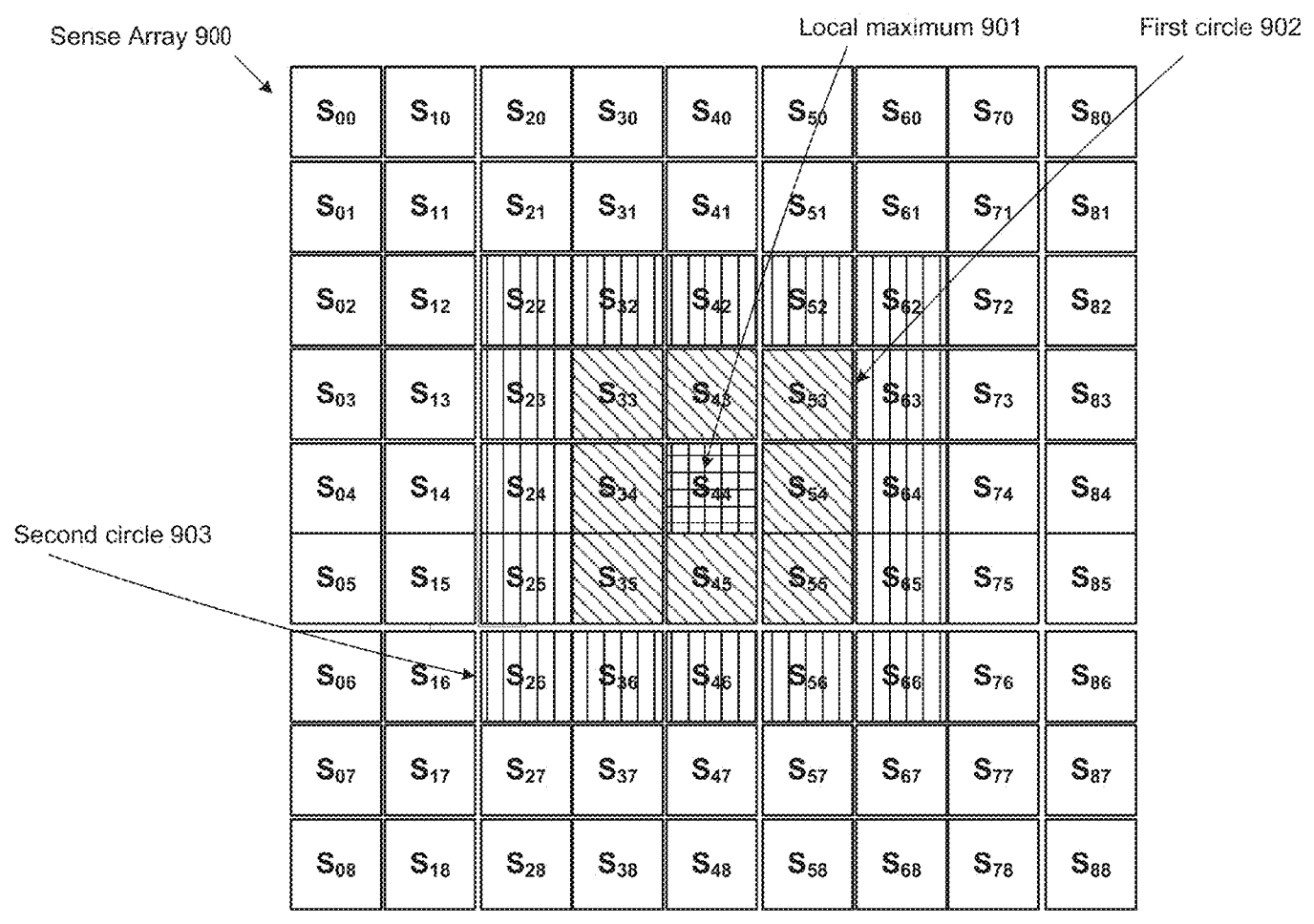

At block 835 of method 800, processing logic determines if a wet finger is present. In one embodiment, processing logic compares the sum of the measured mutual capacitance of the cells of a second circle around the local maximum to a sum threshold. FIG. 9 may be used to help illustrate local maximum, first circle, and second circle. If the sum of the second circle around the local maximum is greater than the sum threshold, a wet finger is detected. If the sum of the second circle around the local maximum is less than or equal to the sum threshold, a wet finger is not detected. The local maximum may be the cell with the largest count (capacitance measurement). Cells may be represented as squares in an XY coordinate system. The first circle around the local maximum may include the 8 cells immediately surrounding the local maximum. The second circle around the local maximum may include the 16 cells that immediately surround the first circle. A sum threshold for the sum of all capacitance data for the second circle around the local maximum may, for example, range from 480 to 520 counts. For purposes of illustration the following touch data for different type of touches is described. For an 18 mm fat finger touch, the local maximum may be 76 counts, the sum of the first circle around the local maximum may be 412 counts, and the sum of the second circle around the local maximum may be 355 counts. For a 22 mm fat finger, the local maximum may be 66 counts, the sum of the first circle around the local maximum may be 328 counts, and the sum of the second circle around the local maximum may be 406 counts. For a 9 mm wet finger touch with water on the sense array, the local maximum may be 64 counts, the sum of the first circle around the local maximum may be 379 counts and the sum of the second circle around the local maximum may be 599 counts. It should be noted that mutual capacitance measurements may be used. Processing logic may determine the presence of a wet finger if the sum of mutual capacitance measurements of the second circle around the local maximum exceeds the sum threshold of, for example 480 counts.

Raw data measurements for different types of touches is contained in the below table. The table shows the local maximum in the finger area and the raw capacitance data for the first and second circles around the local maximum for different kinds of touches.

| | Raw measured capacitance data | | |
|---|---|---|---|
| Type of touch | Local maximum | First circle around local maximum | Second circle around local maximum |
| 18 mm fat finger touches | 76 | 69, 71, 72, 71, 9, 32, 14, 74 | 21, 68, 70, 68, 12, 32, 12, 0, 0, 0, 0, 0, 0, 0, 25, 46 |
| 22 mm fat finger touches | 66 | 63, 64, 63, 49, 0, 13, 11, 65 | 58, 57, 58, 60, 34, 31, 0, 0, 0, 0, 0, 0, 0, 0, 43, 65 |
| 9 mm wet finger touch with water on panel | 64 | 43, 50, 46, 49, 46, 45, 46, 54 | 37, 39, 50, 29, 12, 29, 37, 39, 33, 36, 39, 37, 41, 50, 51, 40 |

In another embodiment, processing logic may determine the presence of a wet finger by comparing the number of cells in the first and second circles around the local maximum with mutual capacitance measurements greater than a Wet Finger Threshold. The number of cells in the first and second circles around the local maximum with mutual capacitance measurements greater than the Wet Finger Threshold may be greater for a wet finger than for a fat finger. The Wet Finger Threshold may be set to, for example, the local maximum divided by two or the local maximum divided by three. In both cases, the number of cells with mutual capacitance measurements greater than the Wet Finger threshold is greater for a wet finger than a fat finger. For example, a 22 mm fat finger may produce a local maximum of 66 counts. With the threshold set at local maximum divided by 2, the number of cells exceeding the threshold in the first circle is 5 and in the second circle, 7. In comparison, a 9 mm wet finger may produce a local maximum of 64 counts. With the threshold set at local maximum divided by two, the number of cells exceeding the threshold in the first circle is 8 and in the second circle, 13. In another example, a 22 mm fat finger with the threshold set at local maximum divided by 3, the number of cells exceeding the threshold in the first circle is 5 and in the second circle, 8. In comparison, a 9 mm wet finger with the threshold set at local maximum divided by 3, the number of cells exceeding the threshold in the first circle is 8 and in the second circle, 15. Processing logic may determine if the touch is a wet finger if the number of cells that exceed the fat finger threshold is greater than a number, for example 17.

A table showing the calculations for two methods to recognize a wet finger are provided below:

| | Raw measured capacitance data | | |
|---|---|---|---|
| Type of touch | Local maximum | First circle around local maximum | Second circle around local maximum |
| 18 mm fat finger touches | 76 | 69, 71, 72, 71, 9, 32, 14, 7 4 | 21, 68, 70, 68, 12, 32, 12, 0, 0, 0, 0, 0, 0, 0, 25, 46 |
| 22 mm fat finger touches | 66 | 63, 64, 63, 49, 0, 13, 11, 6 5 | 58, 57, 58, 60, 34, 31, 0, 0, 0, 0, 0, 0, 0, 0, 43, 65 |
| 9 mm wet finger touch with water on panel | 64 | 43, 50, 46, 49, 46, 45, 46, 54 | 37, 39, 50, 29, 12, 29, 37, 39, 33, 36, 39, 37, 41, 50, 51, 40 |

If no wet finger is detected in block 835, processing logic proceeds to block 840 to detect a touch by a fat finger. Processing logic detects a fat finger (e.g., 14 mm or greater finger) touch by calculating the XY coordinates of the touch on the sense array using the function FatFinger_CorrectCoord( ). Processing logic may reset the two threshold values, SelfMutResetThreshold and MutSelfResetThreshold, both to 1.

If a wet finger is detected in block 835, processing logic proceeds to block 845 to detect a touch by a wet finger. RawDataCorrection( ) is a function to detect a wet finger on the edge of the sense array (e.g., sense array 121). When a wet finger is on the edge of the sense array, the sum of the mutual capacitance measurements of the second circle around the local maximum will be smaller than when a wet finger is near the center of the sense array. The second circle may contain a fewer number of cells than 18 cells. Turning to FIG. 9 for purposes of illustration, if the local maximum is at S14, the second circle around the local maximum will extend outside the active area of sense array 900, and will only have 13 cells. When the local maximum of a touch is in the last or next to last column or row, the number of active cells will be smaller than if the touch was located near the center of the sense array. When processing logic detects that the local maximum is in the last or next to last column or row, processing logic may lower Sum Threshold or Wet Finger Threshold as described above so that a touch from a wet finger may be recognized.

In another embodiment, the function RawDataCorrection( ) may also report a wet finger is actually on the edge of the sense array (first two rows or columns from the edge). However, excess water will cause the calculation of the touch location to move towards the center of the display. The embodiment will be further described in FIG. 10.

Continuing the discussion of block 845 of method 800, processing logic may apply the following functions. The function CalculateCentroidPos( ) is a function for calculating the XY coordinate position of a normal finger. The function SetWetFingerParam( ) applies parameters for detecting a wet finger to the condition, FatFinger_CorrectCoord( ). FatFinger_CorrectCoord( ) is used to calculate the XY coordinate position of a touch for a fat finger. The function RestoreFatFingerParam( ) apples parameters for fat finger detection to the function FatFinger_CorrectCoord( ).

FIG. 9 is an example of cells in a sense array, according to one embodiment. In one embodiment, sense array 900 represent an intersection of sense elements (e.g., electrodes) of the sense array 121. In one embodiment, processing logic (e.g., processing logic 102) is configured to detect one or more touches on sense array 121 (e.g., capacitive sense array). The one or more touches produces touch data on the sense array 121, and the processing logic measures the touch data. The touch data may be represented as multiple cells (e.g., sense array 900), each cell (e.g., $S_{0x}$-$S_{8x}$) representing an intersection of sense elements of sense array 121 (e.g., capacitive sense array). In FIG. 9, cells marked $S_{0x}$-$S_{8x}$ represent names identifying cells. In one embodiment, the names $S_{00}$-$S_{88}$ represent locations of cells corresponding to sense array 121. In one embodiment, one or more touches on a sense array 121 produce touch data on cells of sense array 900 and the touch data can be represented as counts (not shown).

In one embodiment, the local maximum (i.e., cell with the largest count) is illustrated by local maximum 901. The first circle around the local maximum is represented by first circle 902 and includes 8 cells. The second circle around local maximum is second circle 903 and includes 16 cells.

Figure 10:
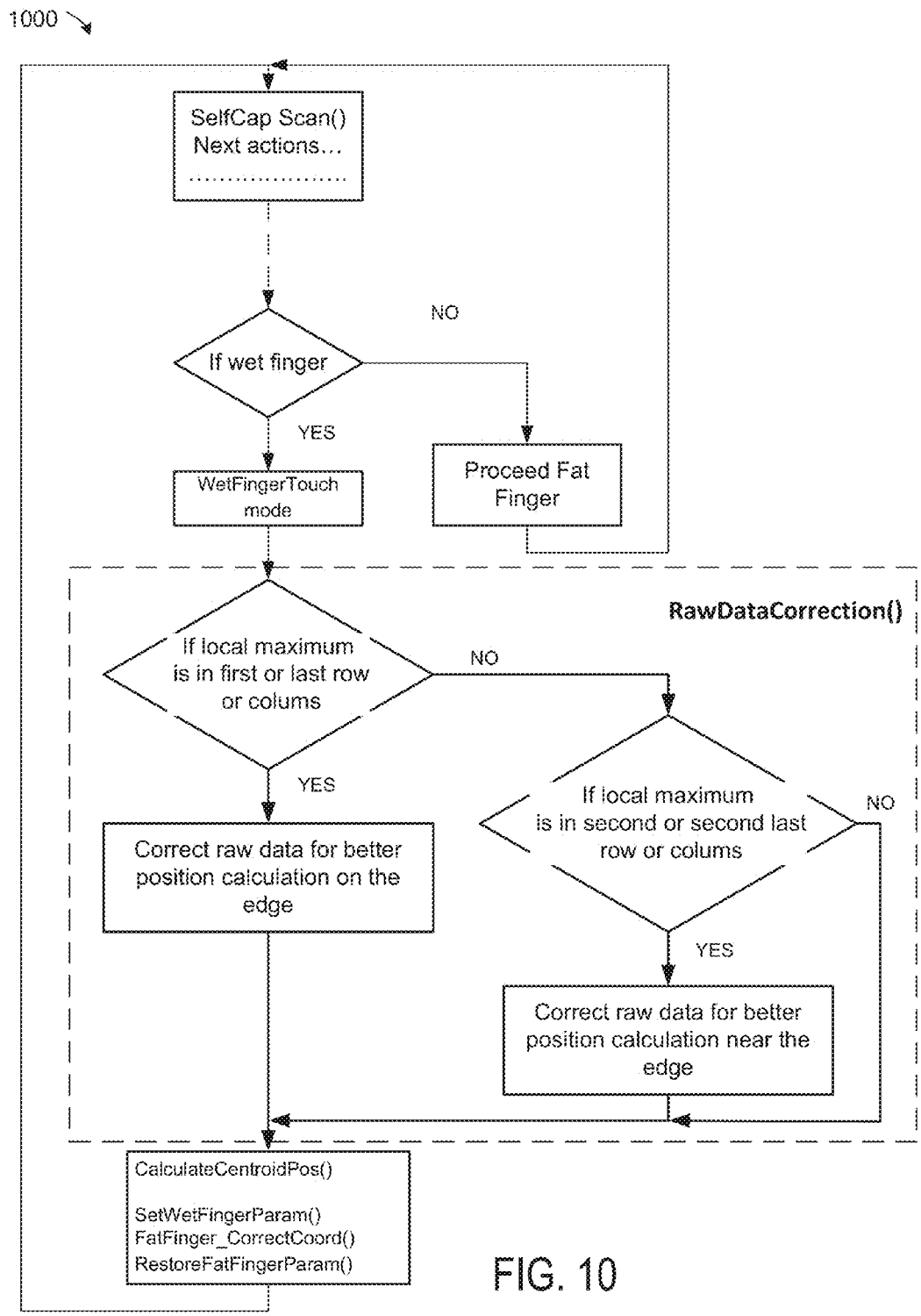
FIG. 10 flowchart of a method illustrating detecting a touch by a wet finger, according to one embodiment.

FIG. 10 flowchart of a method illustrating detecting a touch by a wet finger, according to one embodiment. Method 1000 represents the RawDataCorrection( ) function described in FIG. 8. When a wet finger is on the edge of the panel and water covers the neighboring area, the measured mutual capacitance data near the local maximum is high and very close to the local maximum, as illustrated in FIG. 14A. In such a situation, the centroid function (e.g., CalculateCentroidPos( )) may shift the coordinates of the touch near the edge of the sense array toward the neighboring area, even though the real touch is on or near the local maximum at the edge of the sense array.

In one embodiment, if the wet finger is detected and the local maximum is directly on a cell in the outermost row or column (i.e., first or last row or column), the real touch is on the edge but the high signals of the neighboring cells shift the XY coordinate position towards the center of the sense array. As a result, processing logic may have a difficult time defining gestures such as slide and flick. To avoid the shift, the signals of the neighboring cells but not the local maximum, may be artificially decreased by processing logic, and the position of the touch recalculated using the reduced capacitance values. For example, if all the signals except the local maximum are divided by 3, the measured mutual capacitance values will be decreased, as illustrated in FIG. 14B. It should be noted that the original touch data is not shown.

In another embodiment, if the wet finger is detected and the local maximum is in the next to last row or column, the high signals of the neighboring cells may also shift the XY coordinate position towards the center of the sense array. In this case, the signals of the neighboring cells but not the local maximum, may also be artificially decreased by processing logic. However in this case, the processing logic may choose a divider that is smaller than the above situation. For example, the divider may be ⅔. Dividers may evaluated and tuned for different types of sense arrays (e.g., sense array 121). Touch data divided by a smaller divider is illustrated by FIG. 14C. It should be noted that the original touch data is not shown.

Figure 11:
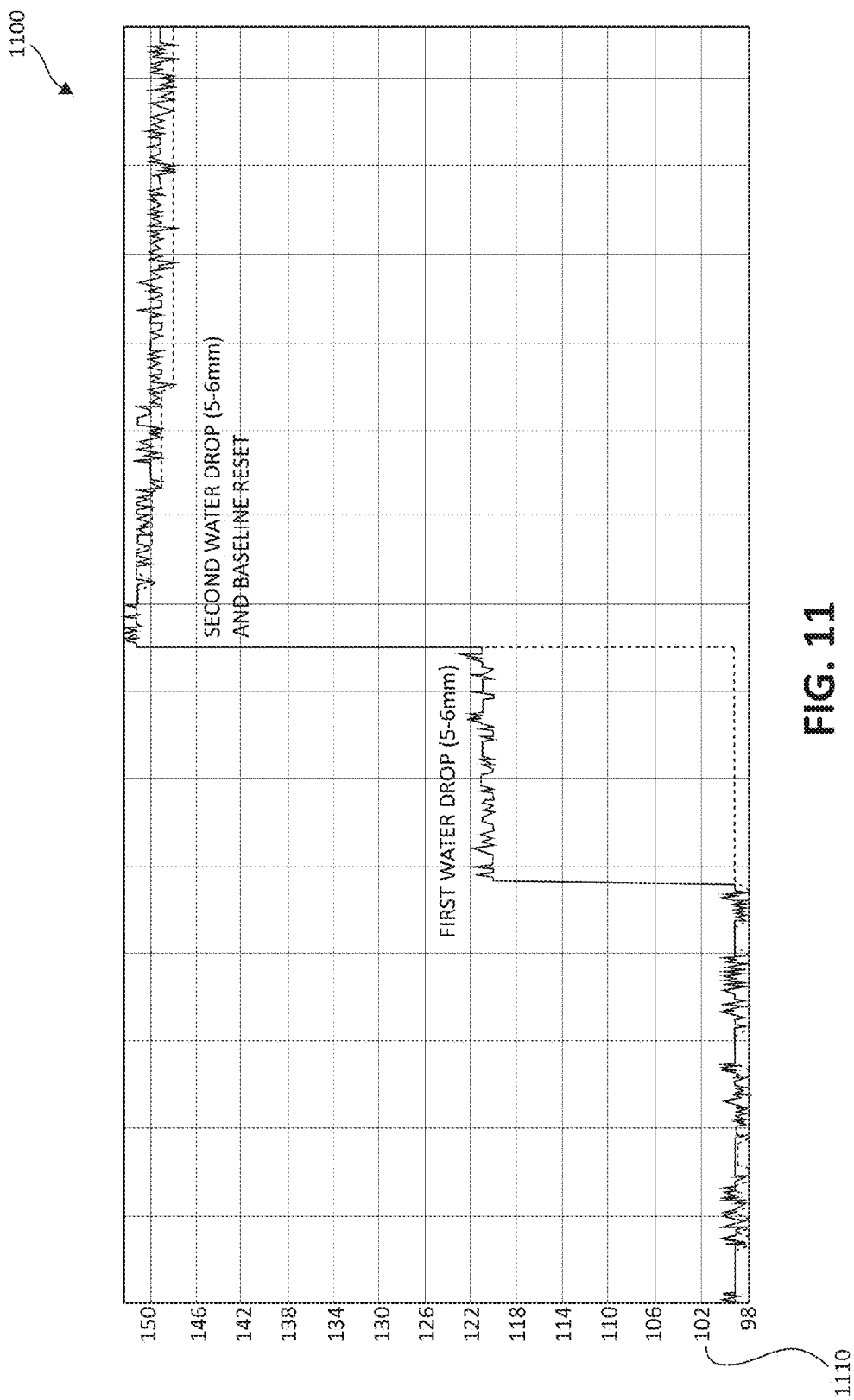
FIG. 11 is a graph illustrating a water baseline reset, according to one embodiment.

FIG. 11 is a graph illustrating a water baseline reset, according to one embodiment. In one embodiment, graph 1100 illustrates capacitive measurement on a capacitive button with and without water. The Y-axis shows the capacitive measurements as counts, i.e., count 1110. Graph 1100 shows an initial baseline value of 98 counts. The first drop of water increases the capacitance measurement to approximately 120 counts. The second drop of water increases the capacitance measurement to approximately 155 counts. The initial baseline value may be reset to the water baseline value of 155.

FIG. 12 is a graph illustrating capacitance measurements of a capacitive button under different conditions, according to one embodiment. In one embodiment, graph 1200 illustrates capacitive measurements on a button without water, with varying amounts of water, and a touch with water on the button. The capacitance measurements are represented in the Y-axis as counts, i.e., count 1210. The initial baseline value is approximately 100 counts. The first drop of water raises the capacitance measurement to approximately 122 counts. The second drop of water raises the capacitance measurement on the button to approximately 146 counts. The third drop of water on the button raises the capacitance measurement to approximately 156 counts. The four drop of water on the button raises the capacitance measurement only slightly to 160 counts. In should be noted that additional water may only slightly raise the capacitance measurement at the button. The initial baseline is reset to the water baseline of approximately 160 counts. As illustrated, a touch by a 9 mm finger raises the measured capacitance roughly 22 counts to 182 counts.

Figures 13A, 13B, 13C:
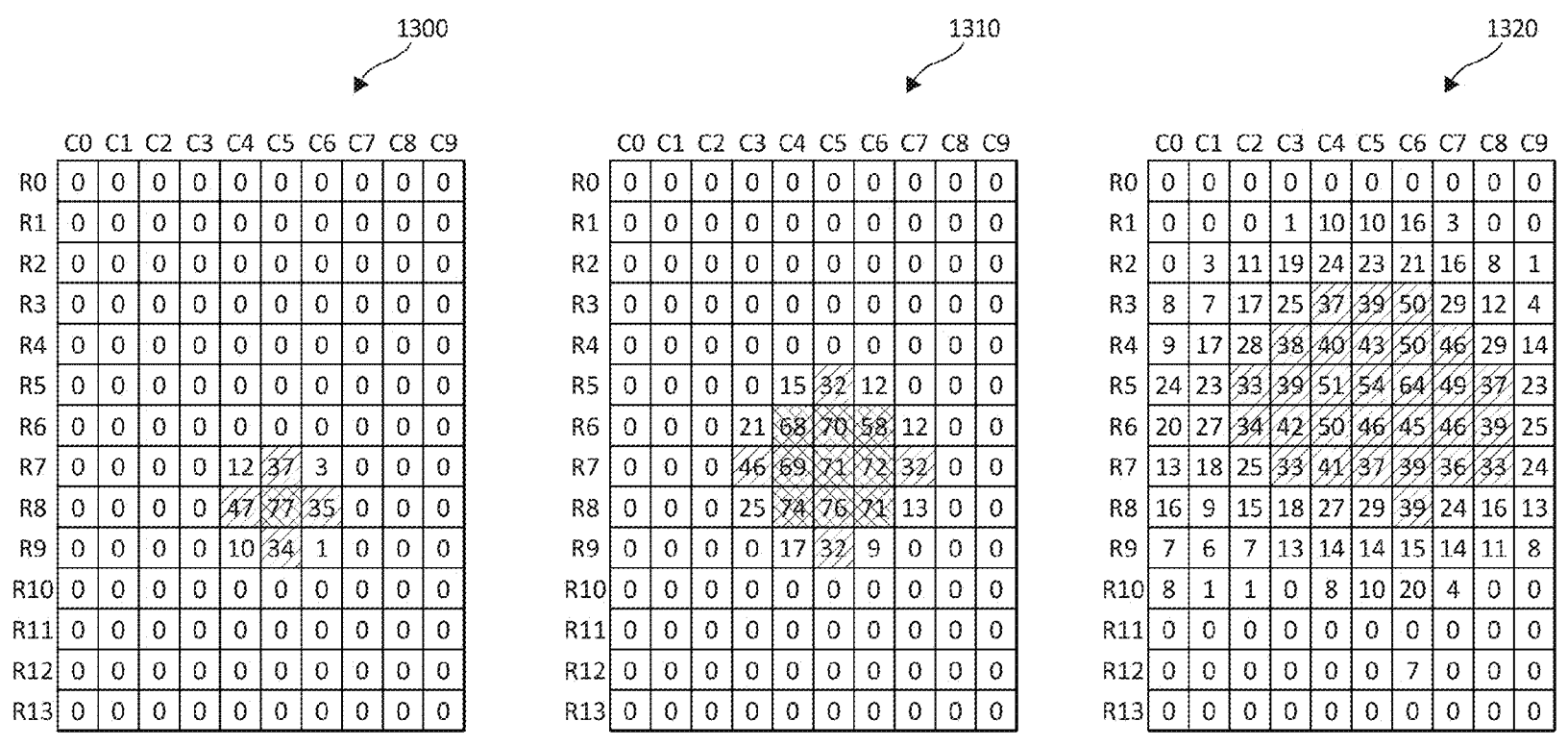

FIG. 13A illustrates cells of a sense array, according to one embodiment. Sense array 1300 illustrates cells of a sense array in a series of rows and columns. The cells contain touch data. In this illustration, the baseline values have been removed, and only the measured capacitance values of a touch are shown. Sense array 1300 shows the touch data of 9 mm dry finger on a sense array.

FIG. 13B illustrates cells of a sense array, according to another embodiment. Sense array 1310 illustrates cells of a sense array in a series of rows and columns. The cells contain touch data. In this illustration, the baseline values have been removed, and only the measured capacitance values of a touch are shown. Sense array 1310 shows the touch data of 18 mm dry finger (e.g., fat finger) on a sense array.

FIG. 13C illustrates cells of a sense array, according to another embodiment. Sense array 1320 illustrates cells of a sense array in a series of rows and columns. The cells contain touch data. In this illustration, the baseline values have been removed, and only the measured capacitance values of a touch are shown. Sense array 1320 shows the touch data of 9 mm wet finger on a sense array.

FIG. 14A illustrates cells of a sense array, according to one embodiment. Sense array 1400 illustrates cells of a sense array in a series of rows and columns. The cells contain measured capacitance values. In this illustration, the baseline values have been removed, and only the measured capacitance values of a touch are shown. Sense array 1400 shows the measured capacitance data of 9 mm wet finger on the edge of the sense array. The raw data near the local maximum is high and close to the local maximum.

FIG. 14B illustrates cells of a sense array, according to one embodiment. Sense array 1410 illustrates cells of a sense array in a series of rows and columns. The cells contain measured capacitance values divided by a divider, except for the local maximum. In this illustration, the baseline values have been removed, and only the measured capacitance values of a touch are shown. Sense array 1400 shows the measured capacitance data of 9 mm wet finger on the edge of the sense array after being corrected by a divider.

FIG. 14C illustrates cells of a sense array, according to one embodiment. Sense array 1420 illustrates cells of a sense array in a series of rows and columns. The cells contain measured capacitance values divided by a divider (smaller than FIG. 14B), except for the local maximum. In this illustration, the baseline values have been removed, and only the measured capacitance values of a touch are shown. Sense array 1420 shows the measured capacitance data of 9 mm wet finger on the edge of the sense array after being corrected by a divider.

The below table contains some of the test used to evaluate the above disclosure:
Tests 1—FALSE Touch test with DROPLET:
 1. Drop several water droplets on the screen on the present of the menu. Droplet sizes that range from 0.1 mm to 9 mm
 2. Observe any FALSE touch (TP (i.e., touch panel) center, TP right edge, TP left edge, TP up edge, TP bottom edge)
Tests 2—FALSE Touch test with DROPLET:
 1. Drop several water droplets on the three self-cap buttons. Droplet sizes that range from 0.1 mm to 9 mm
 2. Observe any FALSE touch (Left button, Mid button, Right button)
Test 3—FALSE Touch test with WATER FILM:
 1. Drop the water film on the screen on the present of the menu. The thickness of water film is 0.1 mm to 1 mm.
 2. Observe any FALSE touch for water film (TP center, TP right edge, TP left edge, TP up edge, TP bottom edge)
Test 4—FALSE Touch test with WATER FILM:
 1. Drop the water film on three self-cap buttons. The thickness of water film is 0.1 mm to 1 mm
 2. Observe any FALSE touch for water film (Left button, Mid button, Right button)
Test 5—Wet Finger Tracking TEST
 1. Drop the water film on the screen on the present of the menu. The thickness of water film is 0.1 mm to 1 mm.
 2. Wet Finger TOUCH TEST with one finger film (TP center, TP right edge, TP left edge, TP up edge, TP bottom edge)
 3. Wet Finger DRAWING TEST (TP center, TP right edge, TP left edge, TP up edge, TP bottom edge)

The processing logic (e.g., processing logic 102) can be implemented in a capacitive touch screen controller. In one embodiment, the capacitive touch screen controller is the TrueTouch® capacitive touchscreen controllers, such as the CY8CTMA3xx family of TrueTouch® Multi-Touch All-Points touchscreen controllers, developed by Cypress Semiconductor Corporation of San Jose, Calif. The TrueTouch® capacitive touchscreen controllers sensing technology to resolve touch locations of multiple fingers and a stylus on the touch-screens, supports operating systems, and is optimized for low-power multi-touch gesture and all-point touchscreen functionality. Alternatively, the touch position calculation features may be implemented in other touchscreen controllers, or other touch controllers of touch-sensing devices. In one embodiment, the touch position calculation features may be implemented with other touch filtering algorithms as would be appreciated by one of ordinary skill in the art having the benefit of this disclosure.

The embodiments described herein may be used in various designs of mutual-capacitance sensing systems, in self-capacitance sensing systems, or combinations of both. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "detecting," "comparing," "resetting," "adding," "calculating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   measuring a first self capacitance on a first electrode;
   measuring a mutual capacitance between a pair of electrodes;
   detecting a first activation of the touch-sensor corresponding to the first electrode and the pair of electrodes when the measured first self capacitance is greater than a first threshold;

29 detecting no activation of the touch-sensor when the measured first self capacitance is less than the first threshold and the measured mutual capacitance is greater than a second threshold; and reporting the first activation or the no activation of the touch-sensor based on the detection of activation or no activation.

2. The method of claim 1, further comprising:

if the measured first self capacitance is less than the first threshold and the mutual capacitance is greater than the second threshold, detecting a second activation of the touch-sensor corresponding to the first electrode and the pair of electrodes if the measured first self capacitance is greater than a third threshold; and reporting the second activation.

3. The method of claim 2, wherein the third threshold represents an activation level of the touch-sensor with water on the touch-sensor and a conductive object on the touch-sensor.

4. The method of claim 2, wherein the third threshold is determined by the steps of:

resetting an first baseline value with a second baseline value;

resetting a touch-sensor threshold with fourth threshold; and adding the second baseline value to the fourth threshold.

5. The method of claim 1, further comprising, prior to the measuring the mutual capacitance between the pair of electrodes:

measuring a second self capacitance on a second electrode;

measuring a third self capacitance on a third electrode;

if the measured first, second, and third self capacitances are above a fifth threshold, detecting no activation of the touch-sensor corresponding to the first electrode and the pair of electrodes.

6. The method of claim 5, wherein the first, second, and third electrodes are representative of an entire array of electrodes.

7. The method of claim 1, further comprising:

detecting a third activation of a touch-sensor corresponding to the first electrode and the pair of electrodes when the measured first self capacitance is no longer less than the first threshold and the measured mutual capacitance is greater than the second threshold; and reporting the third activation.

8. The method of claim 1, wherein the pair of electrodes comprises the first electrode.

9. A touch screen device comprising:

a first plurality of electrodes disposed substantially along a first axis;

a second plurality of electrodes disposed substantially along a second axis, the second axis perpendicular to the first axis, wherein the first and second plurality of electrodes form at least one intersection;

a controller coupled to the first and second pluralities of electrodes and configured to:

measure a first self capacitance on a first electrode of the first plurality of electrodes;

measure a mutual capacitance between a second electrode of the second plurality of electrodes and at least one electrode of the first plurality of electrodes;

detect a first activation of a touch screen device, the first activation corresponding to the first electrode of the when the measured first self capacitance of the first electrode is greater than a first threshold;

30 detect no activation of the touch screen when the measured first self capacitance is less than the first threshold and the measured mutual capacitance is greater than a second threshold; and report the first activation or the no activation of the touch screen device based on the detection of activation or no activation.

10. The touch screen device of claim 9, wherein the controller is further configured to:

if the measured first self capacitance is less than the first threshold and the mutual capacitance is greater than the second threshold, detect a second activation of the touch screen corresponding to the first electrode and the pair of electrodes if the measured first self capacitance is greater than a third threshold; and report the second activation.

11. The touch screen device of claim 10, wherein the third threshold represents an activation level of the touch screen with water on the touch-sensor and a conductive object on the touch screen.

12. The touch screen controller of claim 9, further configured to:

measure a second self capacitance on a third electrode of the first plurality of electrodes;

measure a third self capacitance on a fourth electrode of the first plurality of electrodes;

if the measured first, second, and third self capacitances are above a fifth threshold, detect no activation of the touch screen corresponding to the first electrode and the pair of electrodes.

13. The touch screen controller of claim 12, wherein the first, second, and third electrodes are representative of an entire array of electrodes.

14. A touch screen controller configured to:

measure a first self capacitance on a first electrode coupled to the touch screen controller;

measure a mutual capacitance between a pair of electrodes coupled to the touch screen controller;

detect a first activation of a touch screen, the first activation corresponding to the first electrode and the pair of electrodes when the measured first self capacitance is greater than a first threshold;

detect no activation of the touch screen when the measured first self capacitance is less than the first threshold and the measured mutual capacitance is greater than a second threshold; and report the first activation or the no activation of the touch screen based on the detection of activation or no activation.

15. The touch screen controller of claim 14, further configured to:

if the measured first self capacitance is less than the first threshold and the mutual capacitance is greater than the second threshold, detect a second activation of the touch screen corresponding to the first electrode and the pair of electrodes if the measured first self capacitance is greater than a third threshold; and report the second activation.

16. The touch screen controller of claim 15, wherein the third threshold represents an activation level of the touch screen with water on the touch-sensor and a conductive object on the touch screen.

17. The touch screen controller of claim 14, wherein the third threshold is determined by the steps of:

resetting an first baseline value with a second baseline value;

resetting a touch-sensor threshold with fourth threshold; and adding the second baseline value to the fourth threshold.

18. The touch screen controller of claim 14, further configured to:

measure a second self capacitance on a second electrode;

measure a third self capacitance on a third electrode;

if the measured first, second, and third self capacitances are above a fifth threshold, detect no activation of the touch screen corresponding to the first electrode and the pair of electrodes.

19. The touch screen controller of claim 18, wherein the first, second, and third electrodes are representative of an entire array of electrodes.

20. The touch screen controller of claim 14, further configured to:

detect a third activation of a touch-sensor corresponding to the first electrode and the pair of electrodes when the measured first self capacitance is no longer less than the first threshold and the measured mutual capacitance is greater than the second threshold; and reporting the third activation.

\* \* \* \* \*